United States Patent [19]

Mizukawa et al.

[11] Patent Number: 5,398,974
[45] Date of Patent: Mar. 21, 1995

[54] PIPE CONNECTING MEMBER

[75] Inventors: Kenji Mizukawa, Nishinomiya; Hideki Kageyama, Otsu; Jinichiro Nakamura, Omihachiman; Toshimitsu Ishibashi, Shiga; Kuniaki Onishi, Kusatsu; Shingo Nishikawa, Shiga, all of Japan

[73] Assignee: Sekisui Kagaku Kogyo Kabushiki Kaisha, Osaka, Japan

[21] Appl. No.: 955,719

[22] PCT Filed: Apr. 17, 1992

[86] PCT No.: PCT/JP92/00500

§ 371 Date: Jan. 12, 1992

§ 102(e) Date: Dec. 17, 1992

[87] PCT Pub. No.: WO92/18322

PCT Pub. Date: Oct. 29, 1992

[30] Foreign Application Priority Data

Apr. 19, 1991 [JP] Japan ................. 3-082245
May 9, 1991 [JP] Japan ................. 3-104432
Jun. 24, 1991 [JP] Japan ................. 3-151423

[51] Int. Cl.⁶ ............................. F16L 47/02
[52] U.S. Cl. ........................ 285/21; 285/340; 285/319; 156/293; 219/533
[58] Field of Search ........... 285/21, 22, 340, 319; 156/293, 304.2; 219/533, 534

[56] References Cited

U.S. PATENT DOCUMENTS

| | | | |
|---|---|---|---|
| 2,567,639 | 9/1951 | Fulton | 285/22 |
| 2,930,634 | 3/1960 | Merritt | 285/21 |
| 3,924,882 | 12/1975 | Ellis | 285/340 |
| 4,090,899 | 5/1978 | Reich | 285/21 X |
| 4,094,536 | 6/1978 | Cole et al. | 285/21 X |
| 4,508,368 | 4/1985 | Blummenkranz | 285/21 |
| 4,852,914 | 8/1989 | Lyall | 285/21 |
| 4,865,674 | 9/1989 | Durkin | |
| 4,906,313 | 3/1990 | Hill | 285/21 X |
| 4,927,183 | 5/1990 | Steinmetz et al. | 285/21 |
| 4,958,857 | 9/1990 | Sixsmith | 285/21 |
| 4,997,214 | 3/1991 | Reese | 285/21 X |
| 5,150,922 | 9/1992 | Nakashiba et al. | 285/21 |
| 5,255,942 | 10/1993 | Kenworthy | 285/21 |

FOREIGN PATENT DOCUMENTS

| | | |
|---|---|---|
| 075901 | 6/1983 | European Pat. Off. . |
| 123195 | 10/1984 | European Pat. Off. . |
| 146157 | 6/1985 | European Pat. Off. . |
| 0162659 | 11/1985 | European Pat. Off. ............. 285/21 |
| 253966 | 1/1988 | European Pat. Off. . |
| 378406 | 7/1990 | European Pat. Off. . |
| 396273 | 11/1990 | European Pat. Off. . |
| 2516439 | 5/1983 | France . |
| 2352571 | 10/1974 | Germany . |
| 2454706 | 5/1976 | Germany . |
| 3411179 | 1/1986 | Germany . |
| 9113877.9 | 3/1992 | Germany . |
| 7016 | 6/1977 | Japan . |
| 168427 | 1/1989 | Japan . |
| 206026 | 4/1989 | Japan . |
| 202423 | 7/1989 | Japan . |
| 1-267025 | 10/1989 | Japan . |
| 0042295 | 2/1990 | Japan ................. 285/21 |
| 4145294 | 5/1992 | Japan ................. 285/21 |
| 6401292 | 8/1965 | Netherlands ........... 285/21 |
| 7509760 | 6/1976 | Netherlands . |
| 0017494 | of 1908 | United Kingdom ........ 285/21 |
| 806173 | 12/1958 | United Kingdom . |
| 1514208 | 6/1978 | United Kingdom . |

Primary Examiner—Randolph A. Reese
Assistant Examiner—Heather Shackelford
Attorney, Agent, or Firm—Armstrong, Westerman, Hattori, McLeland & Naughton

[57] ABSTRACT

A pipe connecting member which includes a cylindrical receiving member has a first end and a second end. The first end of the cylindrical receiving member has a fusion part into which an end portion of a resin pipe can be received, and also has a coil buried therein. The coil has two energization terminals to allow the coil to be heated by energization thereof. The second end has a connecting part. A conduit composing part having at least one opening is provided, and the connecting part of the second end of the receiving member is connected to one opening of the conduit composing part.

13 Claims, 39 Drawing Sheets

Fig. 34
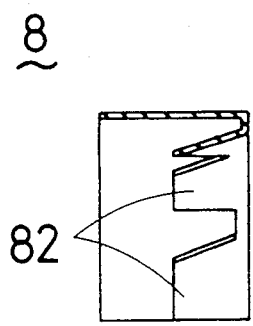
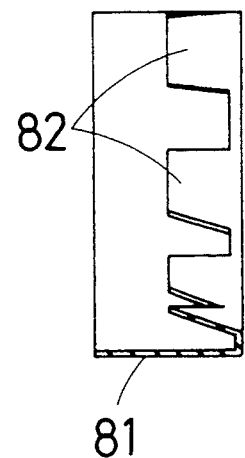

PIPE CONNECTING MEMBER

TECHNICAL FIELD

The present invention relates to a pipe connecting member used for connecting resin pipes end to end.

BACKGROUND ART

Various types have been hitherto proposed as the pipe connecting member for burying a coil heated by energization in a joint main body.

For example, as known in the pipe connecting member disclosed in the Japanese Patent Publication No. 4429/1958, coils are buried in the end portions of a branch pipe formed in a T-shape or pipe bodies in various shapes, and by energizing the individual coils with the end portion of resin pipe inserted in each end portion of the pipe body, the end portions of the resin pipes are connected.

In the case of this pipe connecting member, however, since the coils are directly buried in the end portions of the pipe body formed by injection molding or the like to form in one body, every time the diameter of the resin pipe to be connected is changed, the pipe connecting member suited to the diameter is required. That is, these pipe connecting members must be manufactured all in different molds in order to prepare multiple pipe connecting members suited to a variety of resin pipes, and hence the productivity is poor and it is not rational.

Accordingly, for example as shown in the Japanese Patent Publication No. 40743/1989, other pipe connecting member is proposed, in which the coil is buried in the entire inner circumference of the joint main body, and by energizing the coil with the end portions of the resin pipes inserted from both side of the joint main body, the resin pipes are connected freely.

In this case, although the resin pipes of various diameters may be directly connected, the resin pipes connected in the joint main body must be held and fused at once, and the installation work is complicated and the installation time is long. Besides, since the resin pipes inserted from both ends of the joint main body are fused at once, a large electric power is required in the case of resin pipe of a large diameter. If a large electric power is not available, at a lower electric power, the energization time must be extended to fuse.

It is therefore attempted, as disclosed in the Japanese Patent Provisional Publication No. 500452/1989, to use a resin pipe preliminarily having an electro-fusion function at one end. That is, in this resin pipe, one end is dilated, and a coil heated by energization is inserted in the dilated part, and the end portion of each pipe body is inserted into the dilated part to fuse.

In the case of this resin pipe, however, since one end is dilated, the wall thickness decreases in the dilated part, and a sufficient strength is not obtained. Besides, the residual stress at the time of dilating is large, and shrinkage may take place in the course of time after dilating, and a sufficient dimensional precision may not be obtained. Yet, although the coil is disposed in the dilated part by inserting the coil at the time of dilating and then cooling, it is not formed sufficiently in one body substantially, and enough fusion is not attained when fusing.

When connecting the resin pipe forming a joint part in various shapes such as flange surface to the pipe connecting members described above, it is necessary to connect an intermediate member to the pipe connecting member after interposing the intermediate member possessing a flange surface that can be connected with the flange surface, which results in a spliced piping. As a result, the cost for connection and installation expense are increased. Similarly, when one resin pipe is made of polyethylene and the other resin pipe is made of vinyl chloride, they cannot be directly fused, and a spliced piping is inevitable.

Furthermore, when connecting the resin pipes by using such pipe connecting members, marking job is required before fusing, which is also annoying. Besides, the marking job serves only for discovering deviation in resin pipes, and will not prevent deviation. In the fusion work, therefore, the resin pipes must be fixed with jigs to prevent from slipping out of the pipe connecting member, and it is always required to carry jigs.

The invention is devised in the light of such background, and is hence intended to present a pipe connecting member excellent in productivity and installation efficiency in various pipes, and capable of performing fusion job easily and simply.

DISCLOSURE OF THE INVENTION

The invention presents a pipe connecting member comprising one or a plurality of receiving members, formed cylindrically, having one end provided with a fusion part to which an end portion of a resin pipe may be fitted and in which a coil heated by energization is buried, and the other end provided with a connecting part, and a conduit composing part possessing at least one opening, wherein the receiving member is connected to an arbitrary opening of the conduit composing part through its connecting part.

In the pipe connecting member of the invention, the connecting part of the receiving member may be connected butt to butt to the opening of the conduit composing part.

In the pipe connecting member of the invention, the opening of the conduit composing part may be inserted in the connecting part of the receiving member to be integrated, and this integration may be achieved by fusion by heating of the coil buried in the connecting part.

In the pipe connecting member of the invention, the connecting part of the receiving member may be fitted into the opening of the conduit composing part to be integrated, and this integration may be achieved by fusion by heating of the coil buried in the connecting part.

In the pipe connecting member of the invention, the fusion part of the receiving member may be provided with stopping means to be engaged with the resin pipe only in the withdrawing direction of the resin pipe inserted in the fusion part.

In the pipe connecting member of the invention, the conduit composing part possesses one or two or more kinds of bent part, branch part, reducing part and joint part.

In the pipe connecting member of the invention, the conduit composing part may be a straight pipe.

In the pipe connecting member of the invention, the conduit composing part may be a straight pipe possessing an opening in the outer circumference, and the connecting part of the receiving member may be fitted in this opening to be integrated.

In the pipe connecting member of the invention, the receiving member may be tapered with a taper part formed in the outer circumferential end portion.

In the pipe connecting member of the invention, a coil in spiral state may be inserted in the sheath tube composing the outer layer in the receiving member, and the both are integrated by a resin material filling up the both.

The pipe connecting member of the invention in the above constitution is formed by connecting the receiving member to the conduit composing part, and therefore it is not necessary to use a forming die for every pipe connecting member, and a wide variety of pipe connecting member may be formed by the combination of the receiving members and conduit composing parts. Besides, if the applicable piping location is known, the receiving member and conduit composing part may be freely connected depending on the piping location, so that a desired pipe connecting member may be formed.

Besides, by tapering the receiving member, the resistance of the soil when applied in the propulsion process may be reduced. Moreover, by disposing the stopping means in the fusion part of the receiving member, it is not necessary to fix to jigs or the like in the fusion work, and the resin pipe inserted in the fusion part may be also aligned.

In addition, by composing the outer layer of the receiving member with the sheath tube, the pipe connecting member of large diameter may be formed efficiently.

BRIEF DESCRIPTION OF THE DRAWINGS

FIG. 34 is a sectional view of line I—I in FIG. 33, FIG. 35 and FIG. 36 are sectional views of essential parts for explaining the action of the stopping ring.

BEST MODE OF CARRYING OUT THE INVENTION

Figure 1:
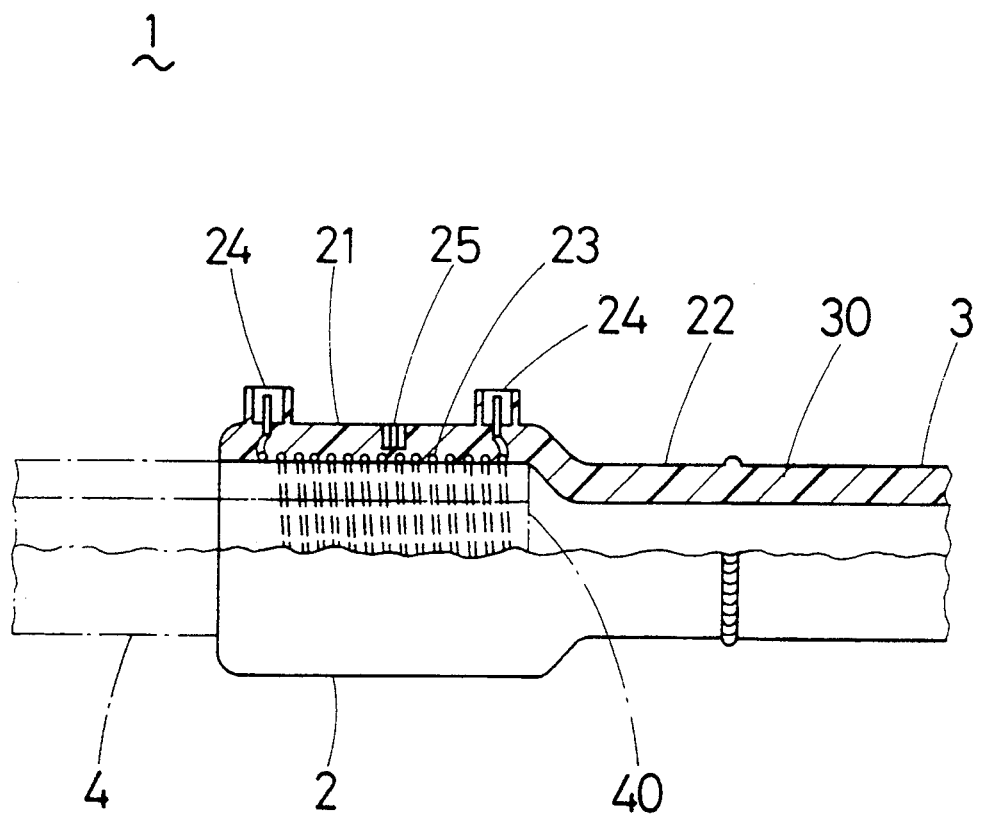
FIG. 1 is a partially cutaway view showing an embodiment of a pipe connecting member of the invention.

Referring now to the drawings, some of the embodiments of the invention are described in detail below.

FIG. 1 is a partial cutaway view showing an embodiment of a pipe connecting member 1 according to the invention.

In this pipe connecting member 1, a receiving member 2 is connected butt to butt to an opening end 30 of a conduit composing part 3.

The receiving member 2 is formed cylindrically, and a fusion part 21 is formed at its one end, while a connecting part 22 is formed at the other end.

In the fusion part 21, a resin pipe 4 can be fitted in its inner circumference. Besides, in the inner circumference, a coil 23 heated by energization is buried, and as the coil 23 generates heat, the resin surrounding the coil 23 is fused. That is, by inserting the end 40 of the resin pipe 4 into the fusion part 21 and energizing the coil 23, the inner wall of the fusion part 21 and the outer wall of the resin pipe 4 are fused and melted together. For this purpose, the coil 23 is buried all around the fusion part 21 so as to keep a sufficient melting area by fusion. An end of the coil 23 is wired to an energization terminal 24 projecting from the outer circumference of the fusion part 21, so as to be energized from the energization terminal 24. On the outer circumference of the fusion part 21, an indicator 25 is provided, so that the fusion state around the coil 23 may be understood by this indicator 25. Furthermore, the base end portion of the fusion part 21 is reduced in diameter to prevent penetration of the end 40 of the resin pipe 4 inserted in the fusion part 21.

Figure 2:
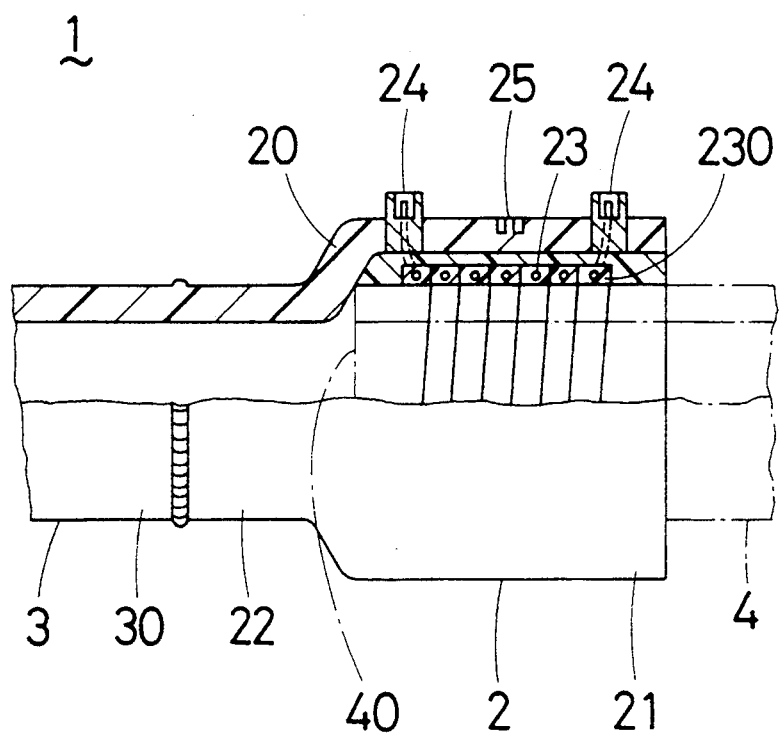
FIG. 2 is a partially cutaway view showing other embodiment of the receiving member in the pipe connecting member shown in FIG. 1, FIG. 3 through FIG. 22 are partially cutaway views showing practical examples of the pipe connecting member.

The connecting part 22 is extended from the base end portion of the fusion part 21, and is formed in the same diameter and thickness as the opening end portion 30 of the conduit composing part 3. It can be connected to the opening end portion 30 of the conduit composing part 3 by butt welding. Thus composed receiving member 2 is wound around the in-core (not shown) of the coil 23 covered with a resin layer 230, usually. It is disposed in a mold (not shown), and the resin material is injection molded at high pressure. However, if the diameter of the receiving member 2 is large, a more resin material must be injected. Accordingly, as shown in FIG. 2, a sheath tube 20 composing the outer layer of the receiving member 20 is disposed outside of the coil 23 covered with the resin layer 230, and the resin material may be injection molded by integrating the sheath tube 20 and coil 23.

Figure 3:
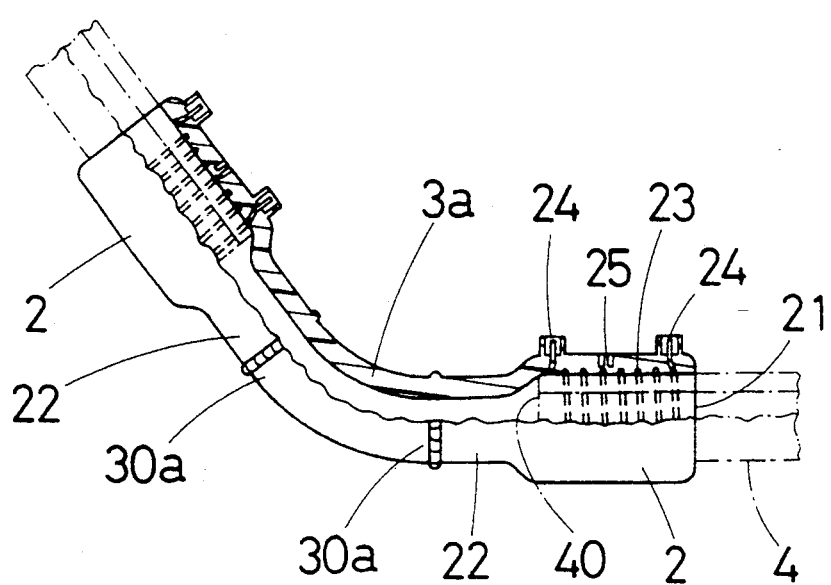
Figure 4:
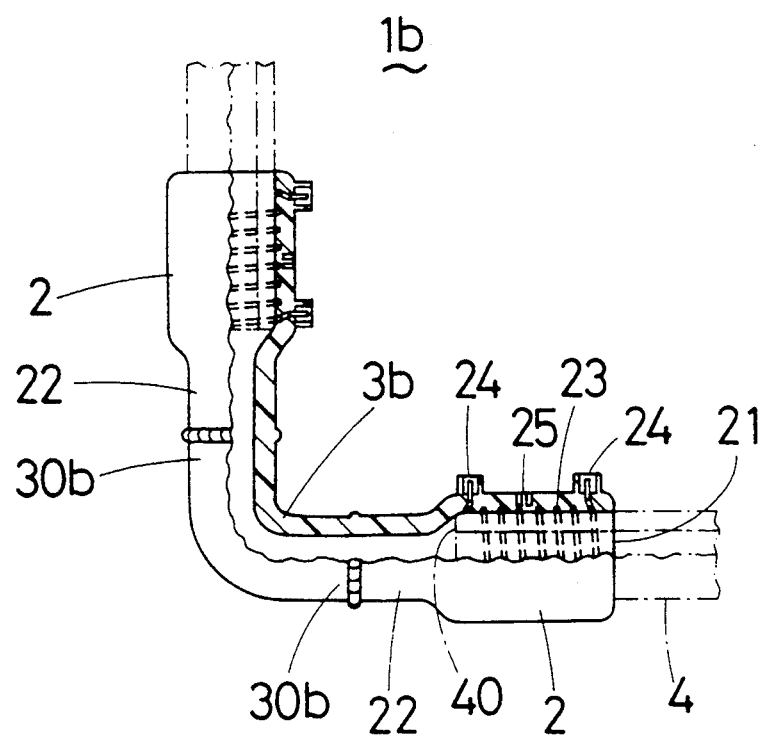
Figure 5:
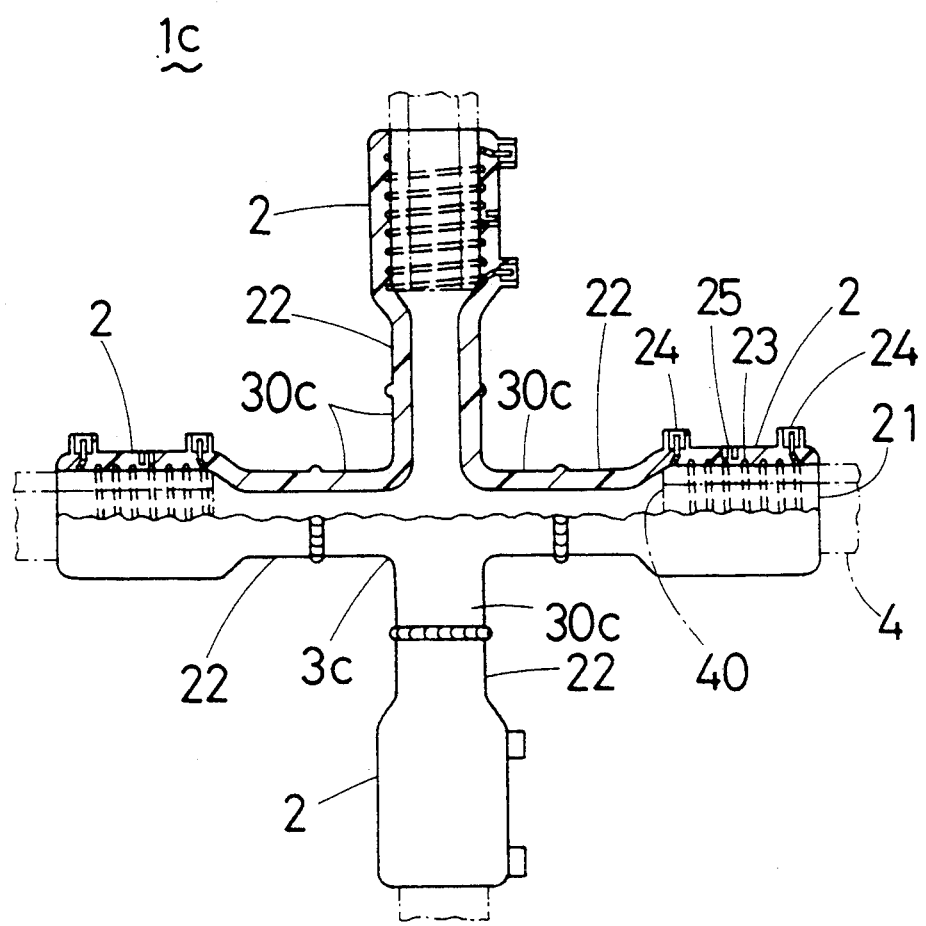
Figure 6:
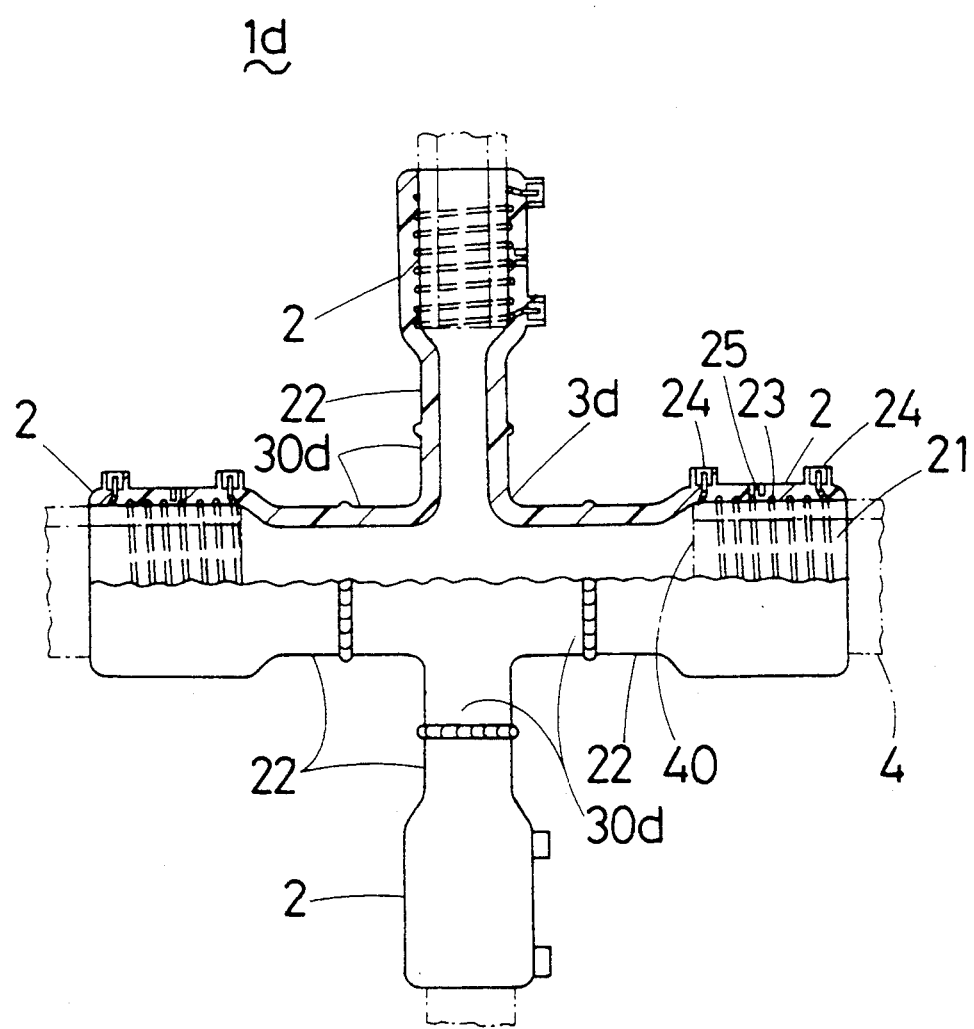
Figure 7:
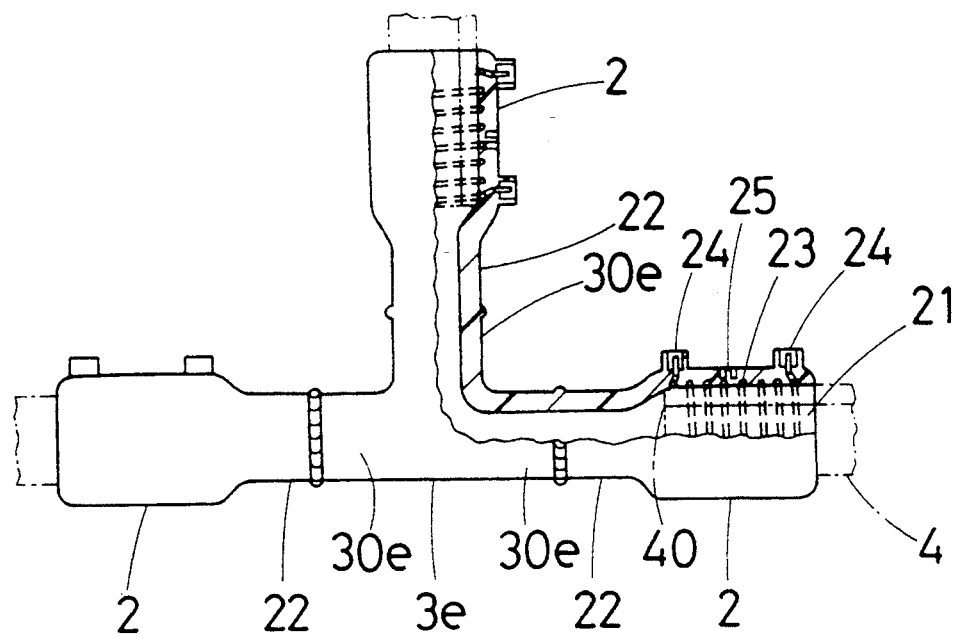
Figure 8:
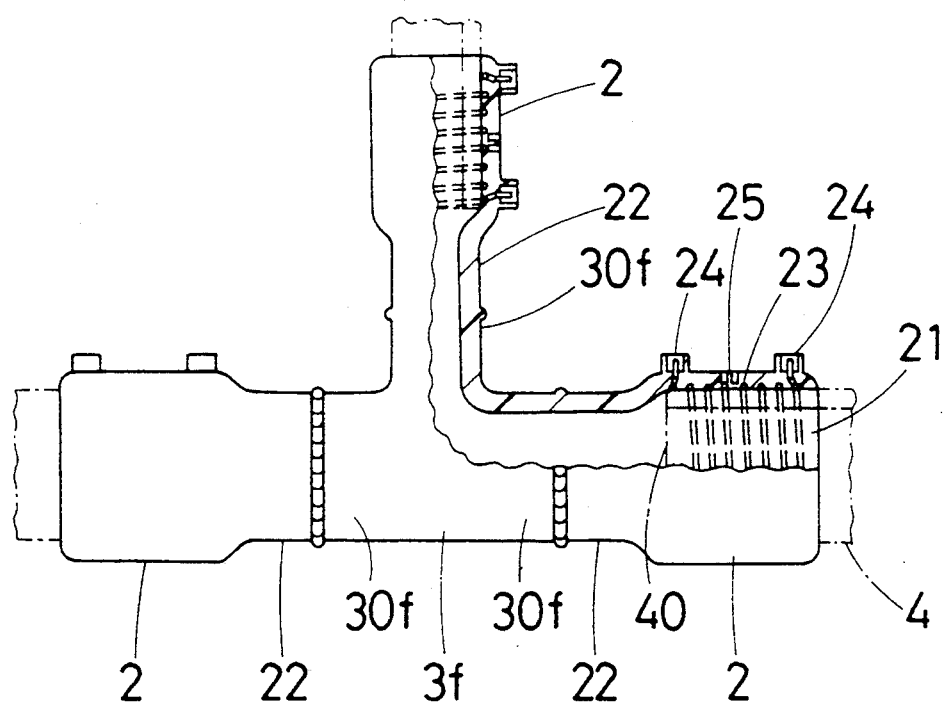
Figure 9:
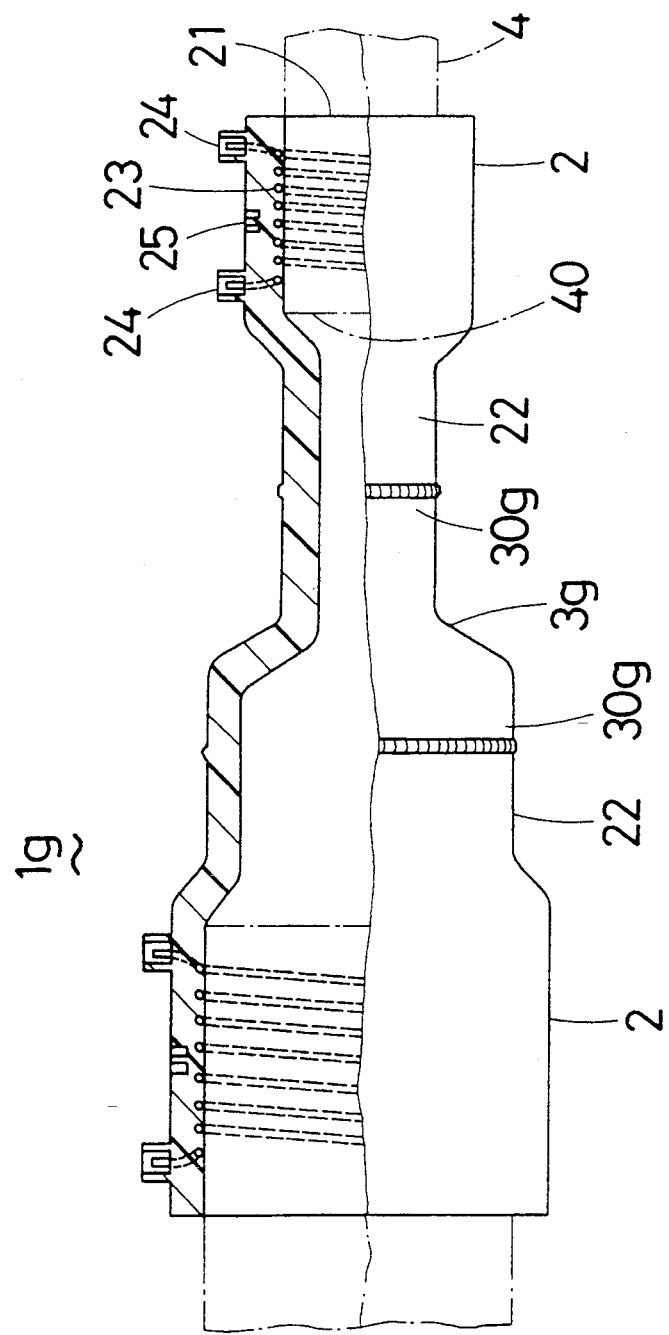
Figure 10:
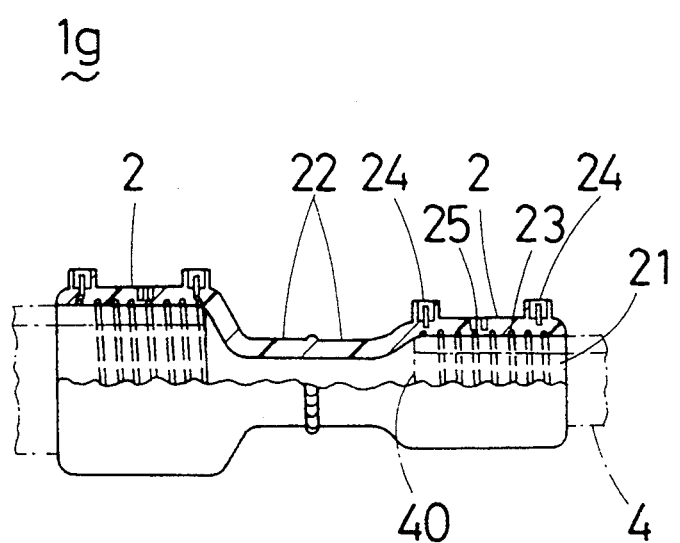

The pipe connecting member 1 may be connected to the resin pipe 4 installed in any conduit by butt connection of a proper receiving member 2 possessing a connecting part 22 to be butt-connected to the opening end portion 30, to the opening end portion 30 of the desired conduit composing part 3. That is, as shown in FIG. 3, by butt connection of the connecting part 22 of the receiving member 2 to the opening end portion 30a of a reducing pipe 3a having a large curvature, a bend joint 1a may be formed, and as shown in FIG. 4, by butt connection of the connecting part 22 of the receiving member 2 to the opening end portion 30b of a reducing pipe 3b having a small curvature, an elbow joint 1b may be formed. Besides, as shown in FIG. 5, by butt connection of the connecting part 22 of the receiving member 2 to the opening end portion 30c of a cross pipe 3c in the same diameter at the pipe end, a cross joint 1c may be formed, and as shown in FIG. 6, by butt connection of the connecting part 22 of the receiving member 2 to the opening end portion 30d of a cross pipe 3d in different diameter at the pipe end, a reducing cross joint 1d may be formed. Furthermore, as shown in FIG. 7, by butt connection of the connecting part 22 of the receiving member 2 to the opening end portion 30e of a T-pipe 3e in the same diameter at the pipe end, a tee joint 1e may be formed, and as shown in FIG. 8, by butt connection of the connecting part 22 of the receiving member 2 to the opening end portion 30f of a T-pipe 3f in a different diameter at the pipe end, a reducing tee joint if may be formed. Moreover, as shown in FIG. 9, by butt connection of the connecting part 22 of the receiving member 2 to the opening end portion 30g of a reducing pipe 3g in a different diameter at the pipe end, a reducer joint 1g may be formed. This reducer joint 1g may be, as shown in FIG. 10, formed also by connecting the connecting parts 22 of the receiving member 2 different in the diameter of the fusion part 21.

Figure 11:
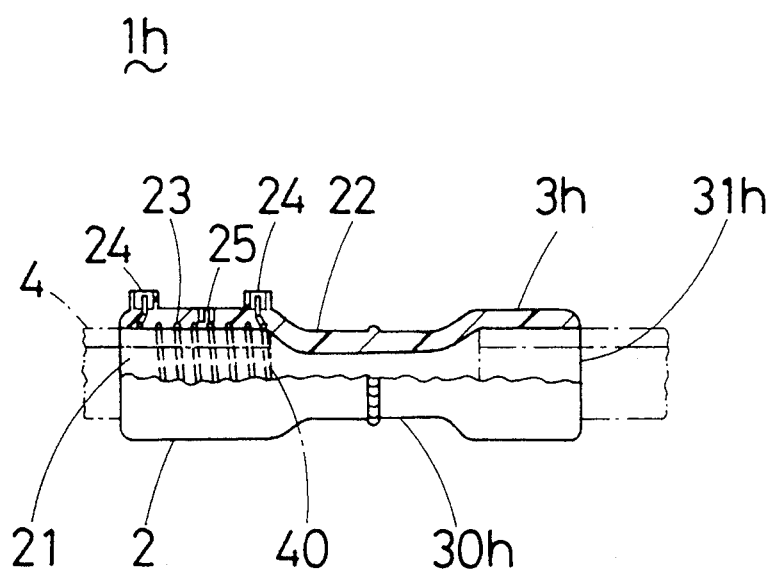
Figure 12:
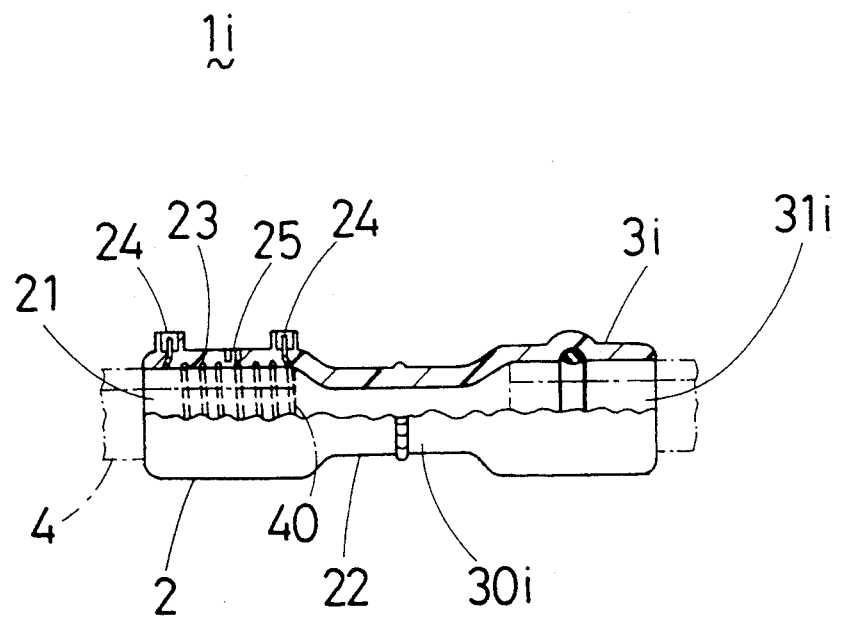
Figure 13:
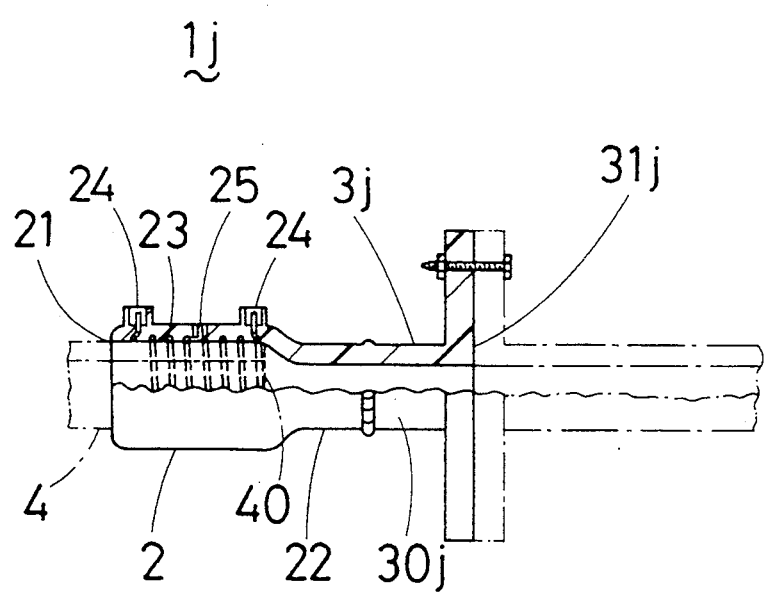
Figure 14:
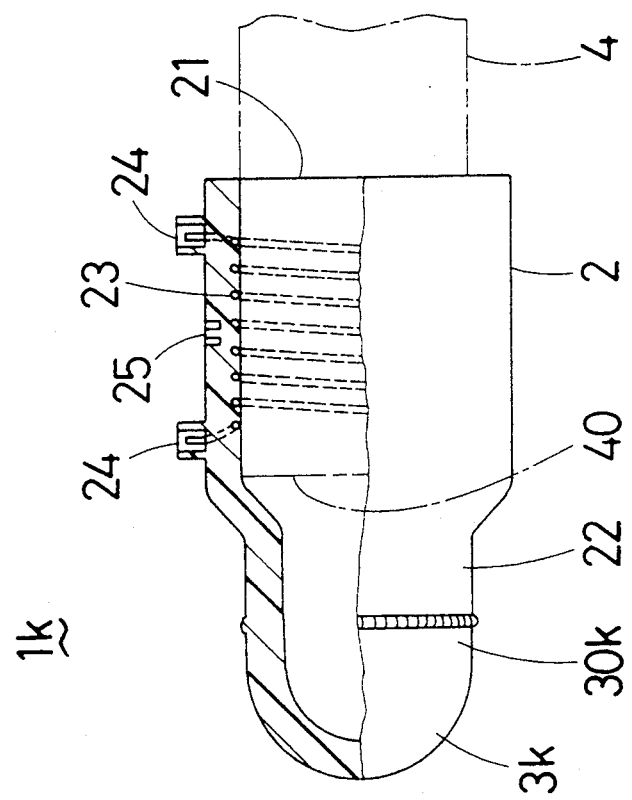
Figure 15:
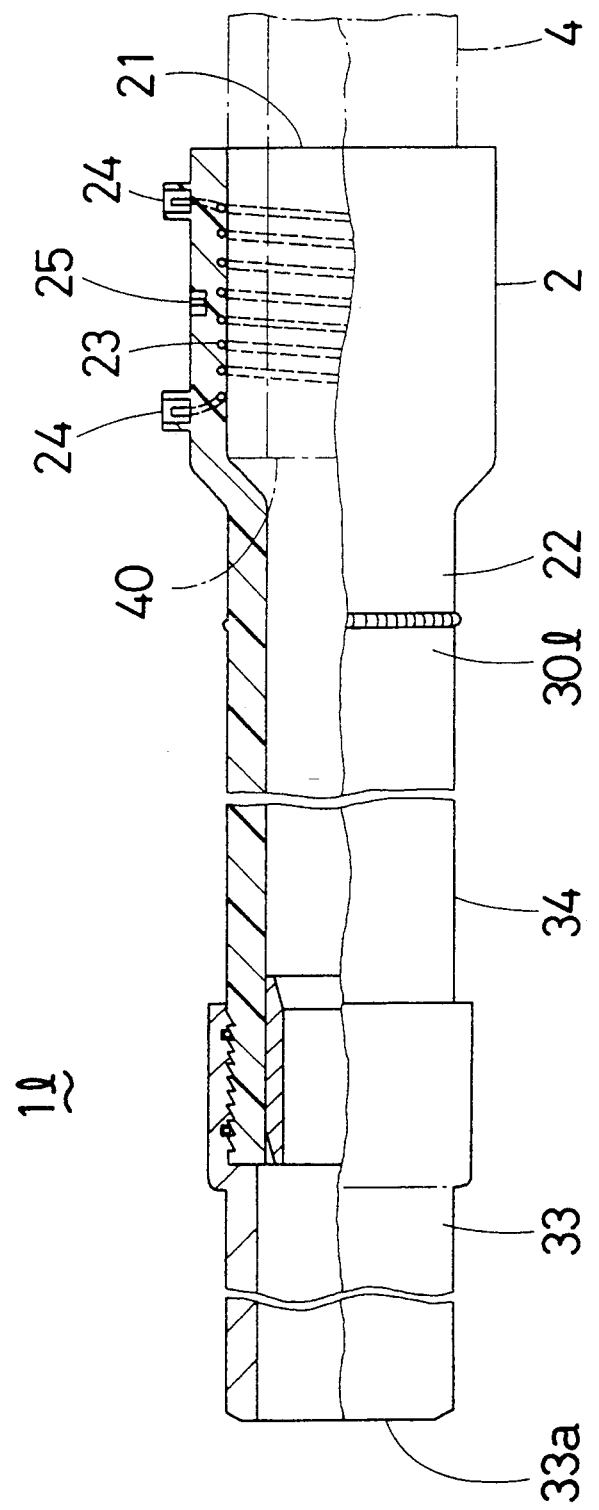

Still more, as shown in FIG. 11, by butt connection of the connecting part 22 of the receiving member 2 to the opening end portion 30h of a joint member 3h having a receiving port 31h of fitting adhesion type, a receiving joint 1h of fitting adhesion type may be formed. Further, as shown in FIG. 12, by butt connection of the connecting part 22 of the receiving member 2 to the opening end portion 30i of a joint member 3i having a receiving port 31i so as to be sealed by a seal ring, a seal receiving joint 1i may be formed. As shown in FIG. 13, by butt connection of the connecting part 22 of the receiving member 2 to the opening, end portion 30j of a joint member 3j possessing a flange surface 31j, a flange receiving joint 1j may be formed. As shown in FIG. 14, by butt connection of the connecting part 22 of the receiving member 2 to the opening end portion 30k of a blind cover member having a blind cover at one end, a pipe end closure member 1k for closure of pipe end may be formed. As shown in FIG. 15, moreover, by butt connection of the connecting part 22 of the receiving member 2 to the other end opening portion 301 of a resin pipe main body 34 having a metal pipe 33 connected at one end, a transition joint 11 may be formed. In the case of this transition joint 11, the other end portion side of the metal pipe 33 may form various joints, such as flange joint (not shown) and welded joint 33a. Besides, the resin pipe main body 34 may be also formed in various shapes such as branch pipe, reducing pipe, bent pipe, and elbow pipe (not shown).

Figure 16:
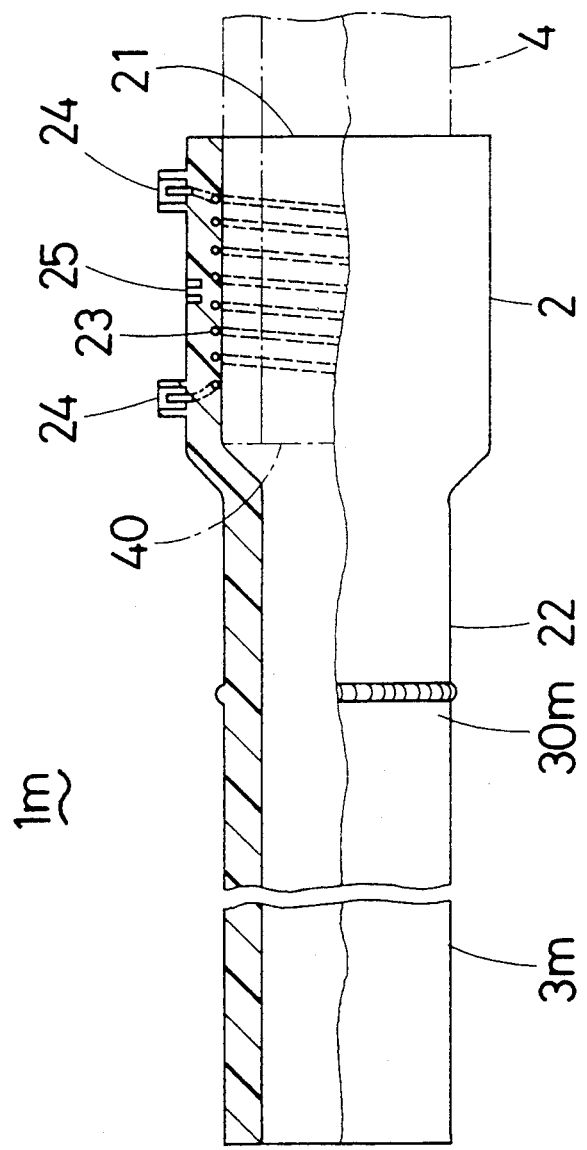
Figure 17:
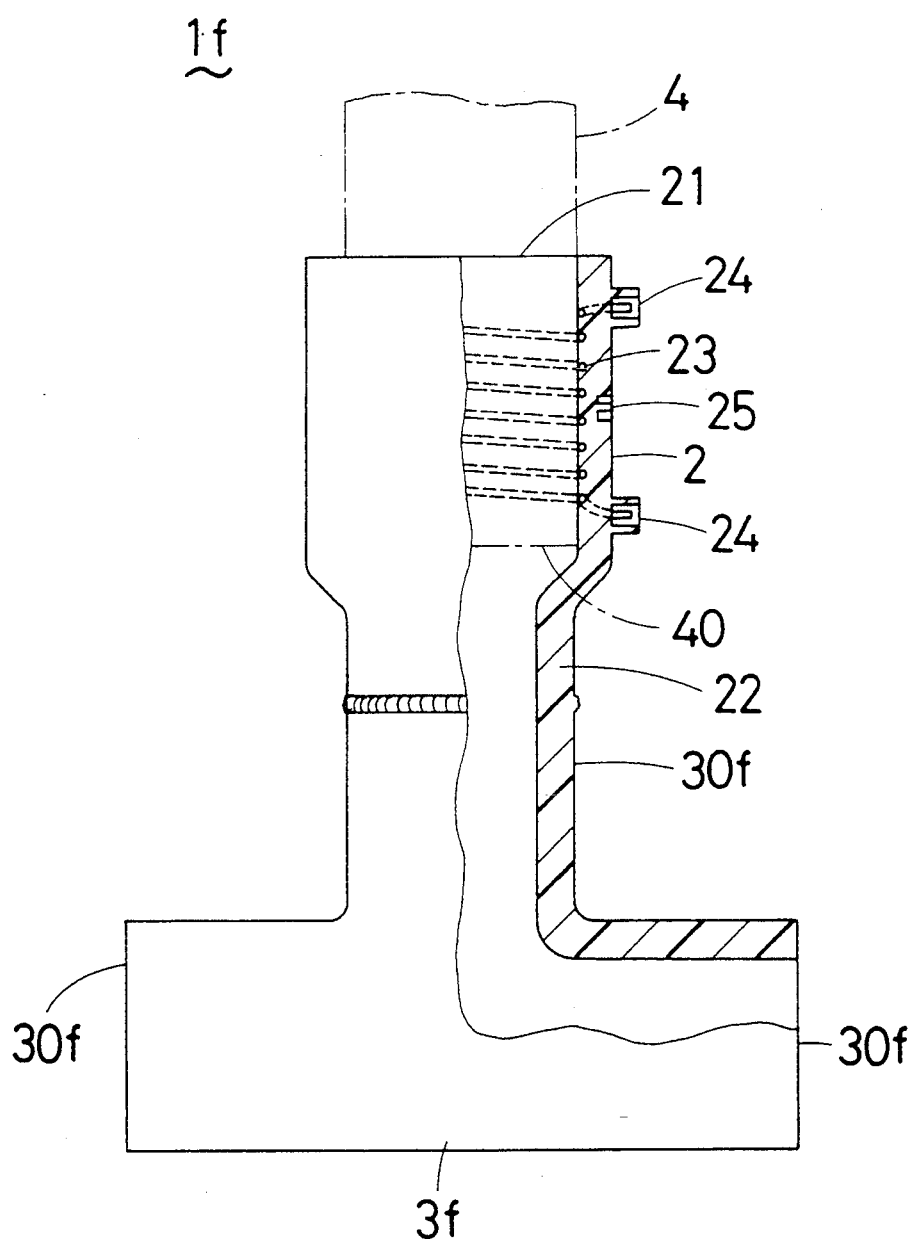
Figure 18:
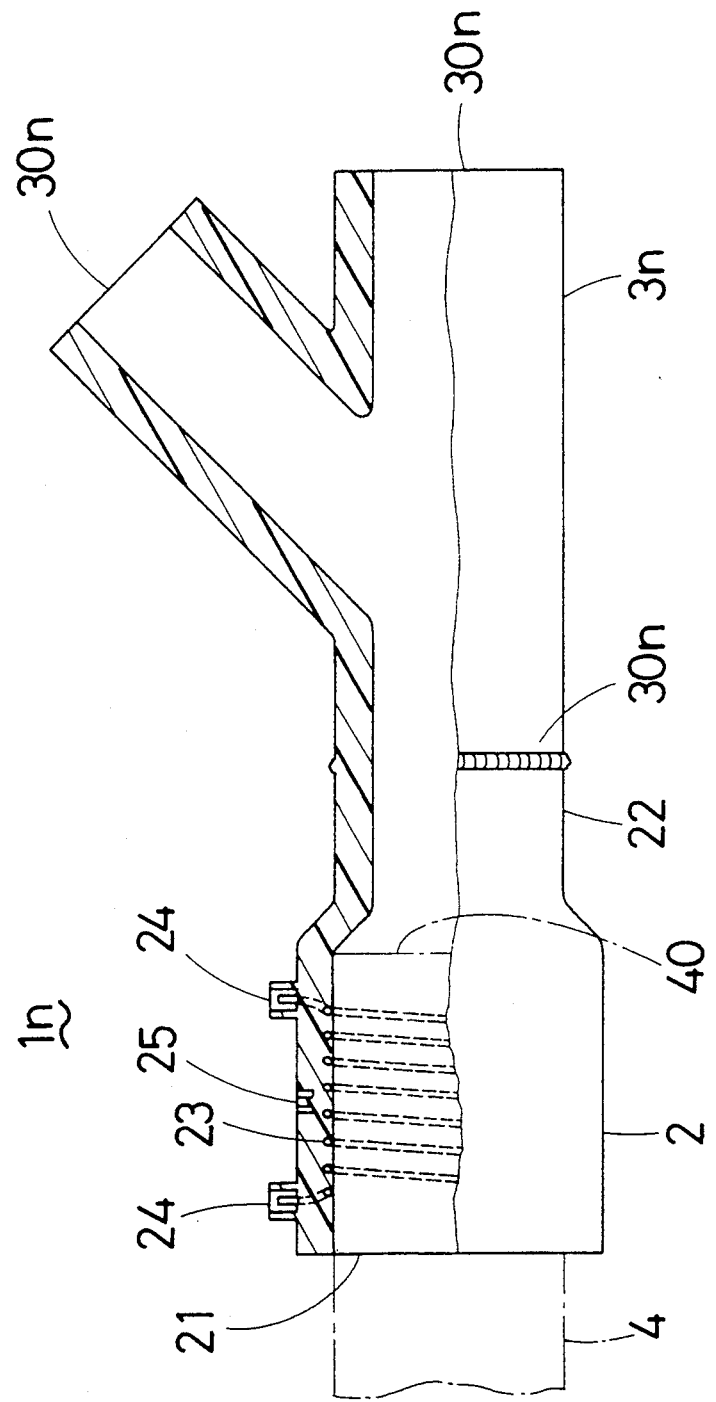
Figure 19:
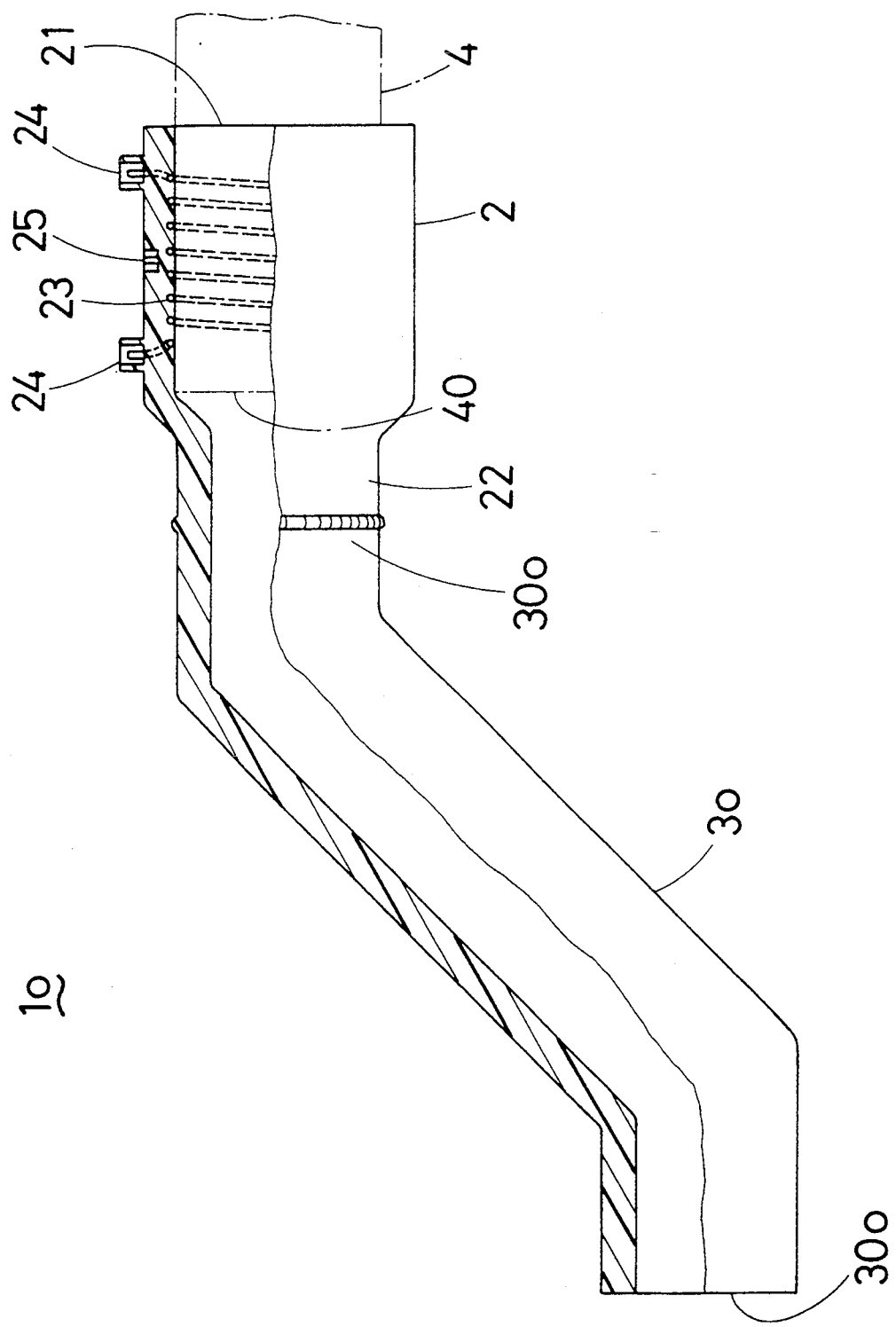
Figure 20:
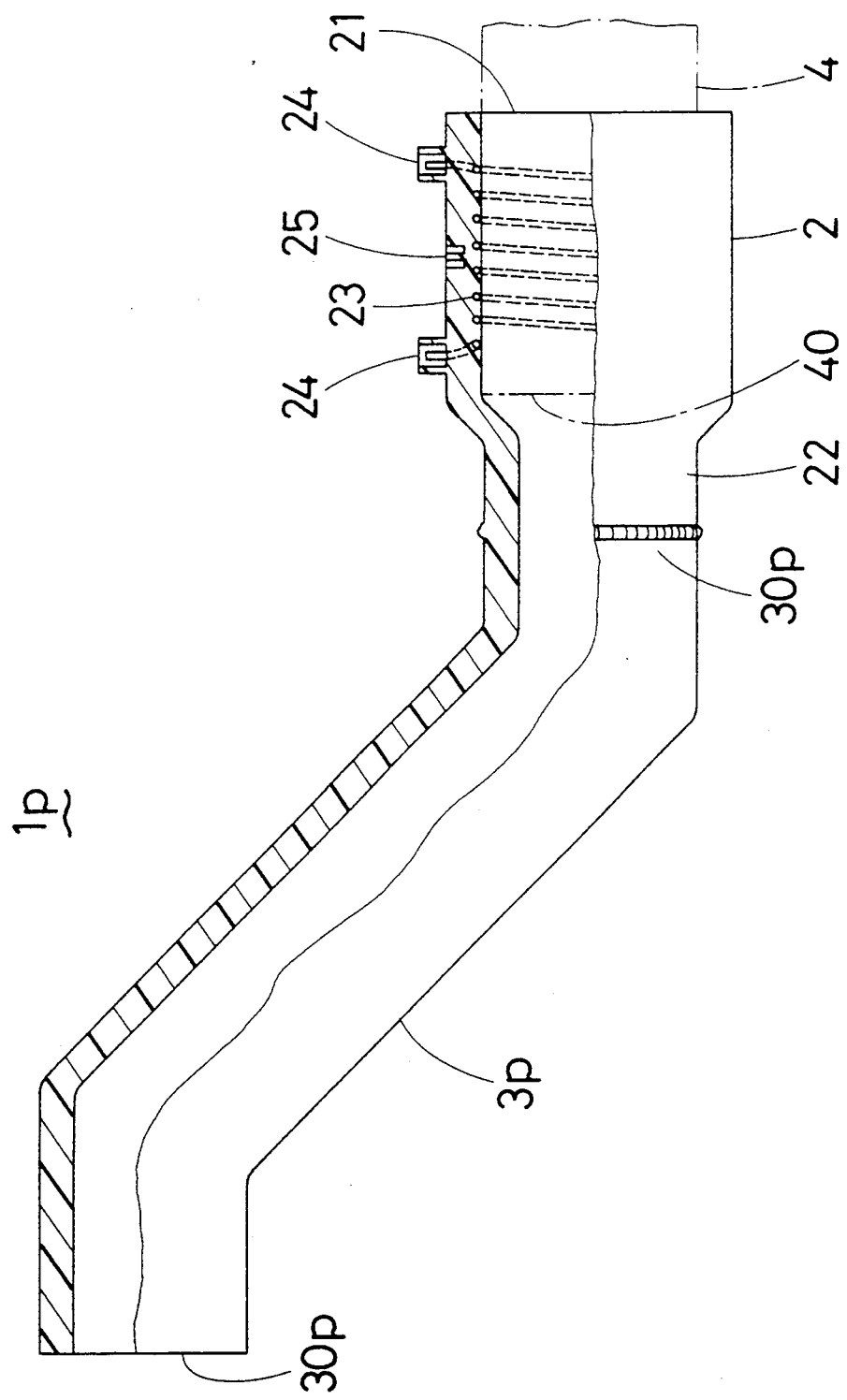
Figure 21:
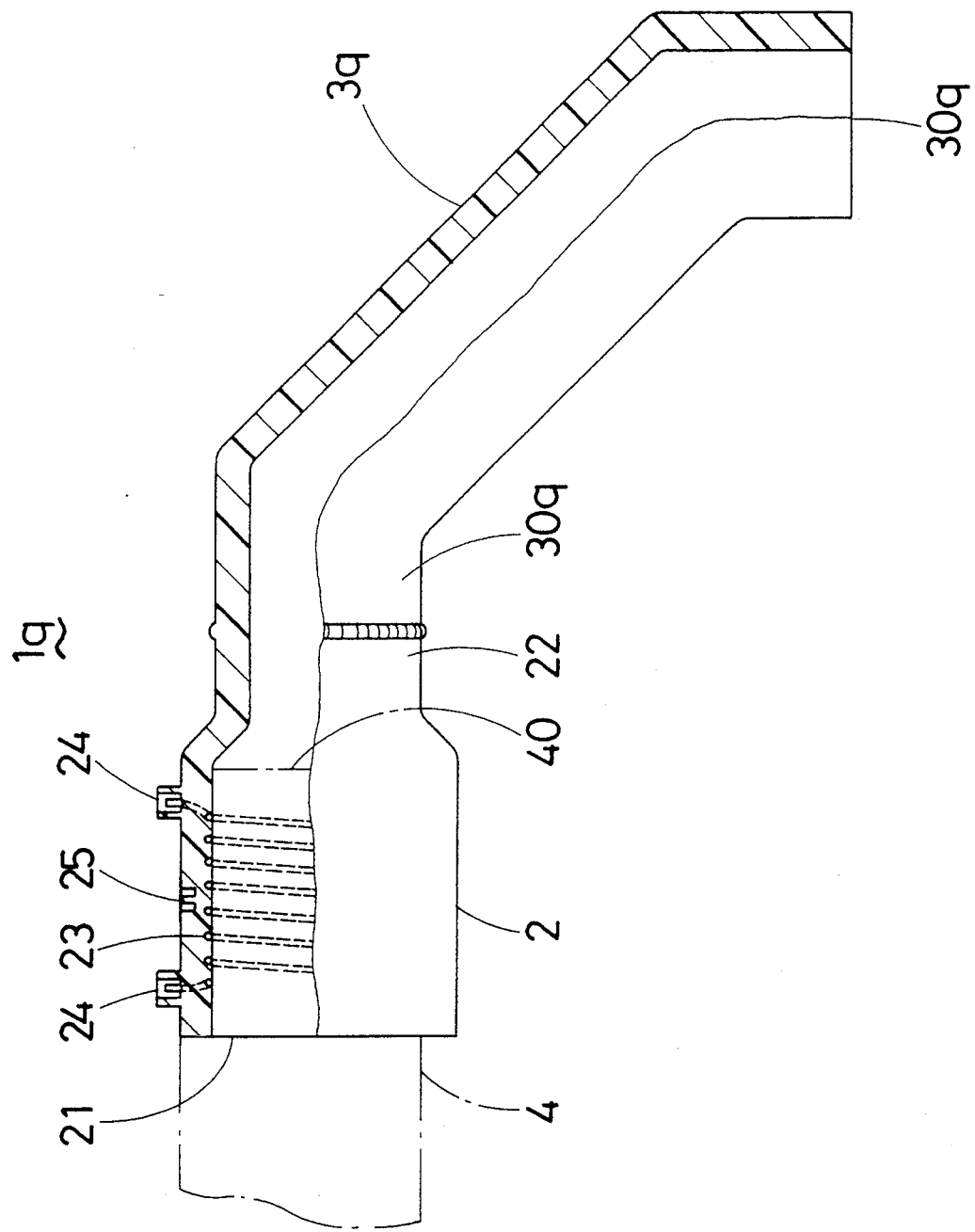
Figure 22:
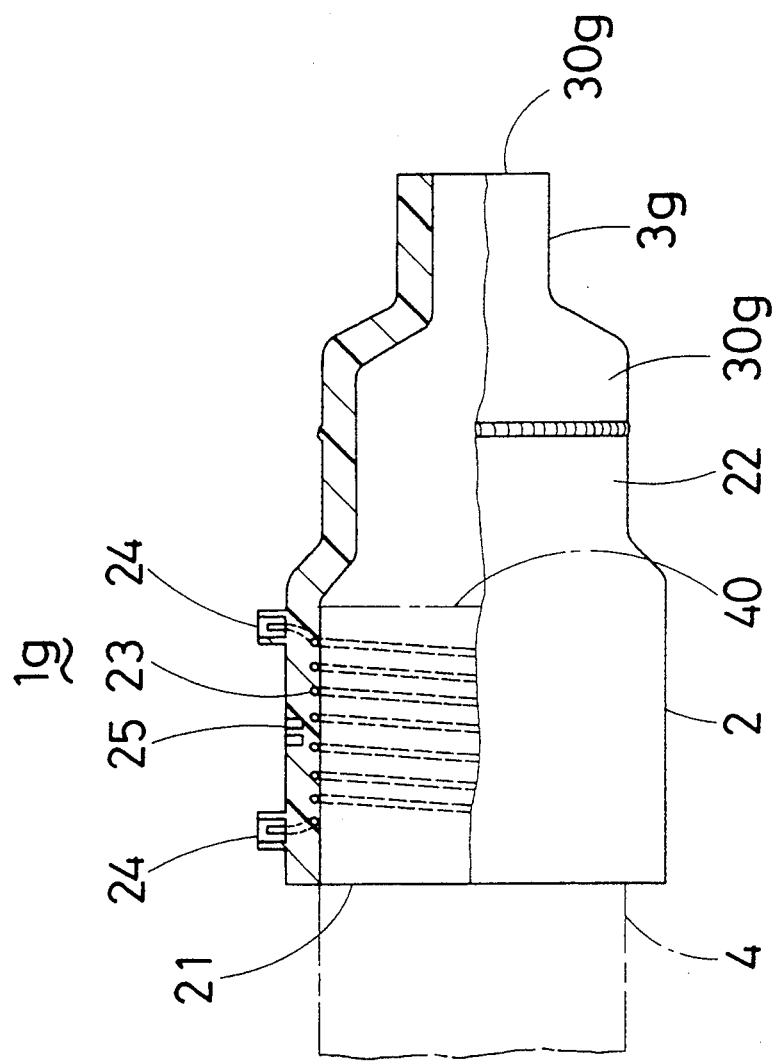
Figure 23:
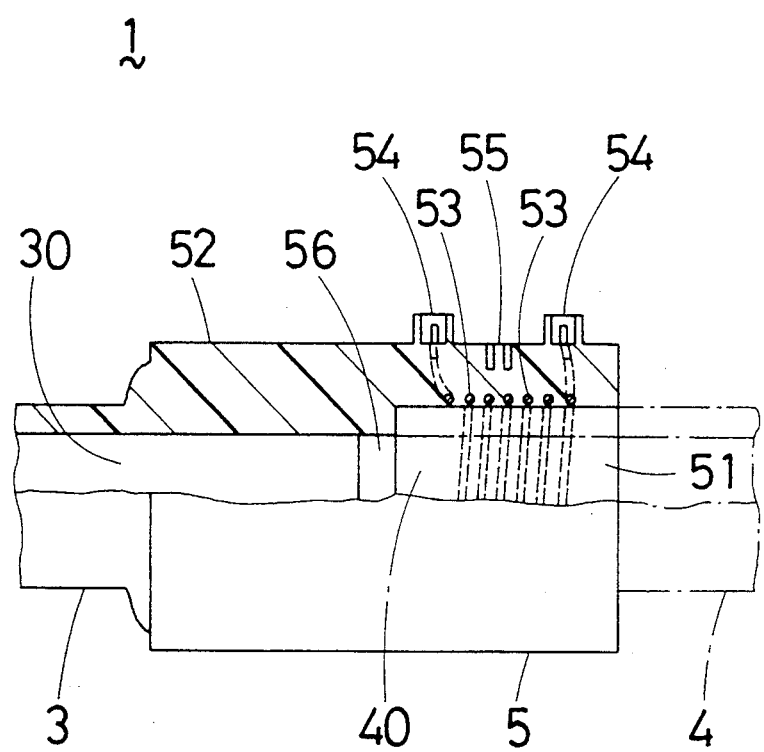
FIG. 23 is a partially cutaway view showing a different embodiment of the pipe connecting member.

In this embodiment, the receiving member 2 is connected butt to butt to all the opening end portions 30 of the pipe connecting members 3 mentioned above, but such structure is not particularly limited, and a proper number of receiving members 2 may be connected, as required, to the desired opening end portions 30. For example, as shown in FIG. 16, by connecting the connecting part 22 of the receiving member 2 to only one position of the opening end portion 30m of a straight pipe 3m, a resin pipe with a receiving port 1m may be formed. Besides, as shown in FIG. 17, by connecting the connecting part 22 of the receiving member 2 only to one position of the opening end portion 30f of the T-pipe 3f, a tee joint if may be formed. As shown in FIG. 18, moreover, by butt connection of the connecting part 22 of the receiving member 2 to one position of the opening end portion 30n of a Y-pipe 3n, a Y-pipe joint In may be formed. As shown in FIG. 19, by butt connection of the connecting part 22 of the receiving member 2 to one position of the opening end portion 30o of an S-bend pipe 3o of a large curvature, an S-bend joint 1o may be formed. As shown in FIG. 10, by butt connection of the connecting part 22 of the receiving member 2 at one position of the opening end portion 30p of a J-bend pipe 3p in the same axial direction in the pipe end direction, a J-bend joint 1p may be formed, and as shown in FIG. 21, by butt connection of the connecting part 22 of the receiving member 2 to one position of the opening end portion 30q of a J-bend pipe 3q differing by 90° in the pipe end direction, a J-bend pipe 1q may be formed. Furthermore, as shown in FIG. 22, by connecting the connecting part 22 of the receiving member 2 to one position only of the opening end portion 30g of the reducing pipe 3g, the reducer joint 1g may be formed. FIG. 23 through FIG. 26 represent other embodiment of the pipe connecting member 1 of the invention. In this embodiment, however, only the receiving member 5 is different from the receiving member 2 in the foregoing embodiments, and only this receiving member 5 is explained below. In the drawings, the same constituent elements as in the foregoing embodiments are identified with the same reference numbers.

The receiving member 5 is cylindrical, and its one end is a fusion part 51, while the other end is a connecting part 52. In the fusion part 51, a resin pipe 4 may be fitted in its inner circumference. In the inner circumference, moreover, a coil 53 heated by energization is buried. The end of the coil 53 is wired to an energization terminal 54 projecting on the outer circumference of the fusion part 51 so as to be energized from the energization terminal 54. An indicator 55 is provided on the outer circumference of the fusion part 51. The connecting part 52 is reduced in diameter, in its inner circumference, as going inward. In the inner circumference of the boundary portion of the base end portion of the connecting part 52 and the base end portion of the fusion part 51, a stop 56 is projecting to arrest penetration of the conduit composing part 3 and resin pipe 5 inserted from both the fusion part 51 and connecting part 52.

Figure 24:
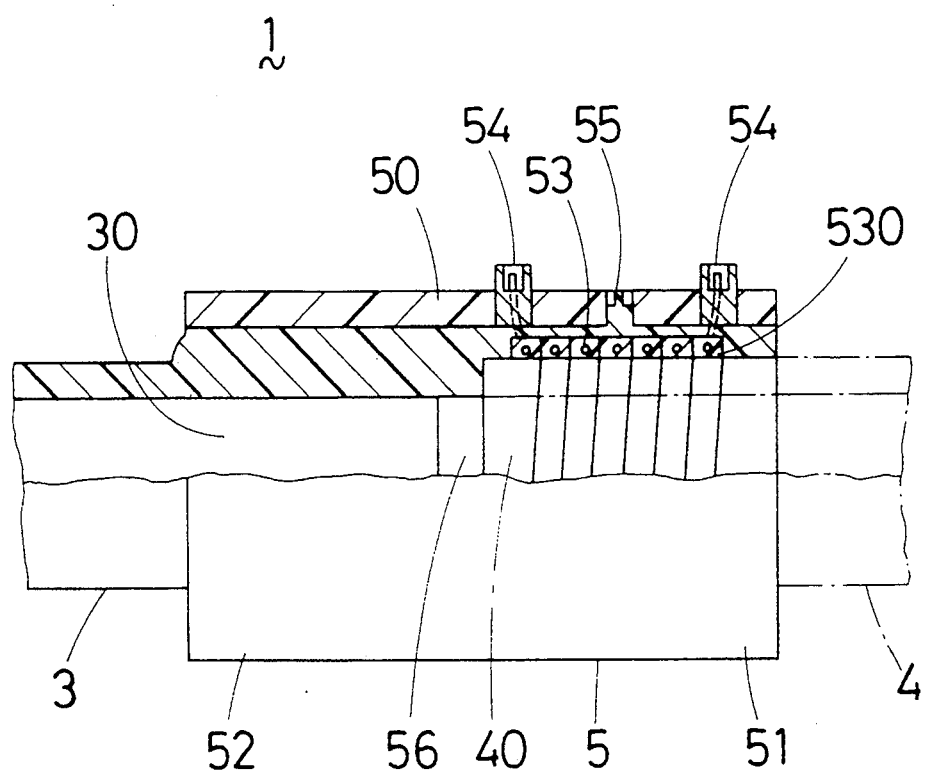
FIG. 24 is a partially cutaway view showing other embodiment of the receiving member in the pipe connecting member shown in FIG. 23, FIG. 25 an explanatory diagram showing a manufacturing method of the pipe connecting member shown in FIG. 23.

Thus composed receiving member 5 is usually obtained by disposing an in-core (not shown) winding a coil 53 in a mold (not shown), and injecting molding a resin material at high pressure, but when the diameter of the receiving member 5 is large, a more resin material must be injected. Accordingly, as shown in FIG. 24, outside the coil 53 covered with a resin layer 530, a sheath tube 50 for composing the outer layer of the receiving member 5 is disposed, and the resin material may be injected molded so as to integrate the sheath tube 50 and coil 53.

Figure 25:
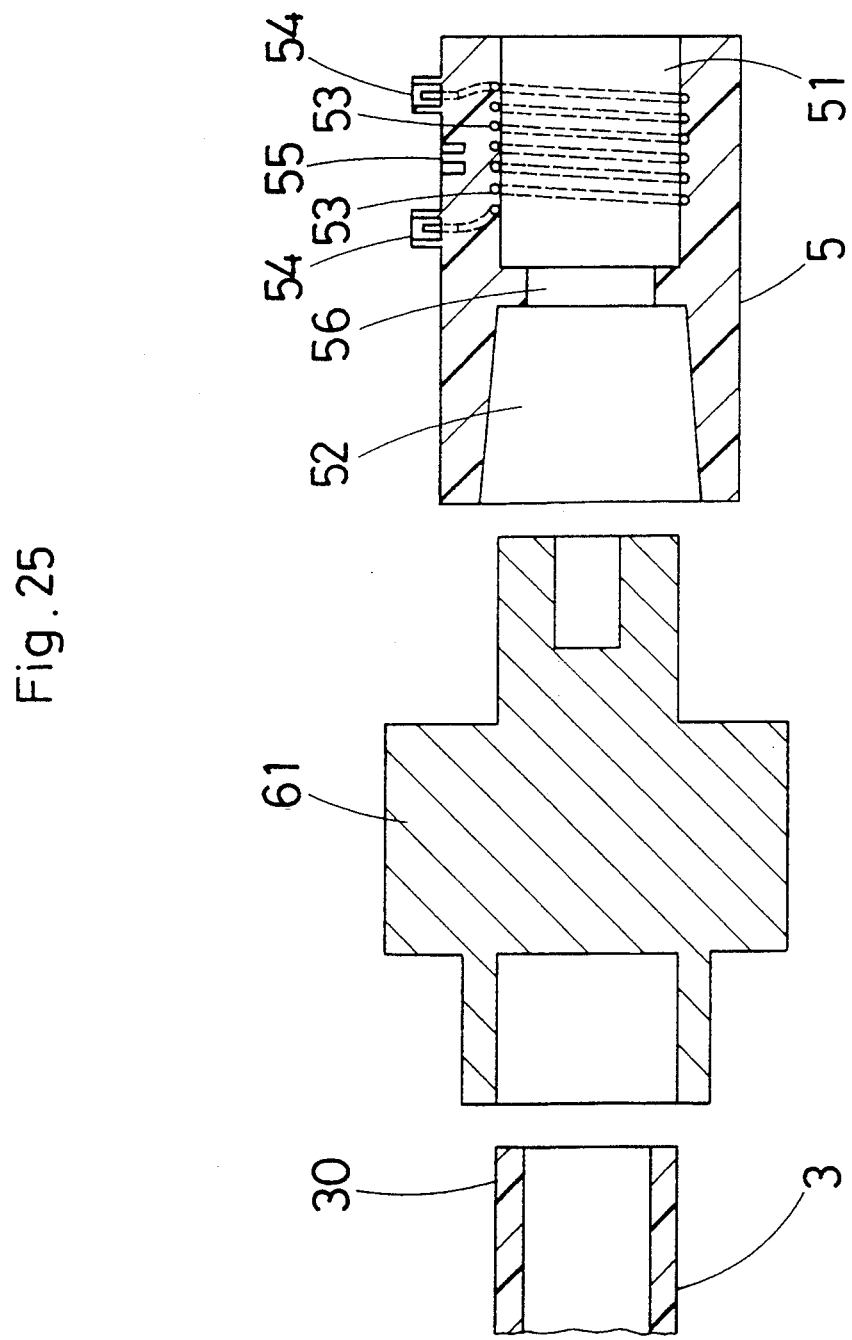
Figure 26:
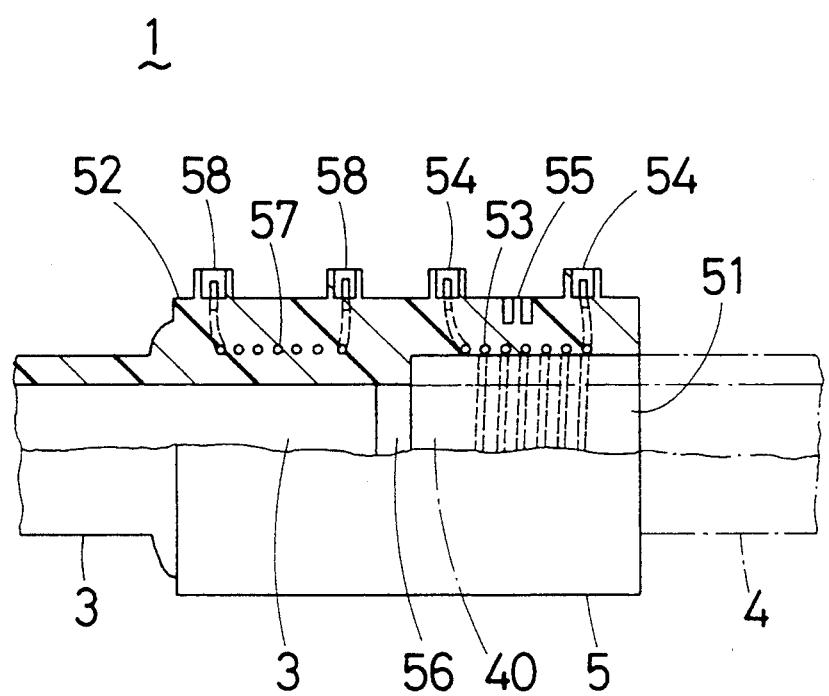
FIG. 26 is a partially cutaway view showing another embodiment of the pipe connecting member shown in FIG. 23.
Figure 27:
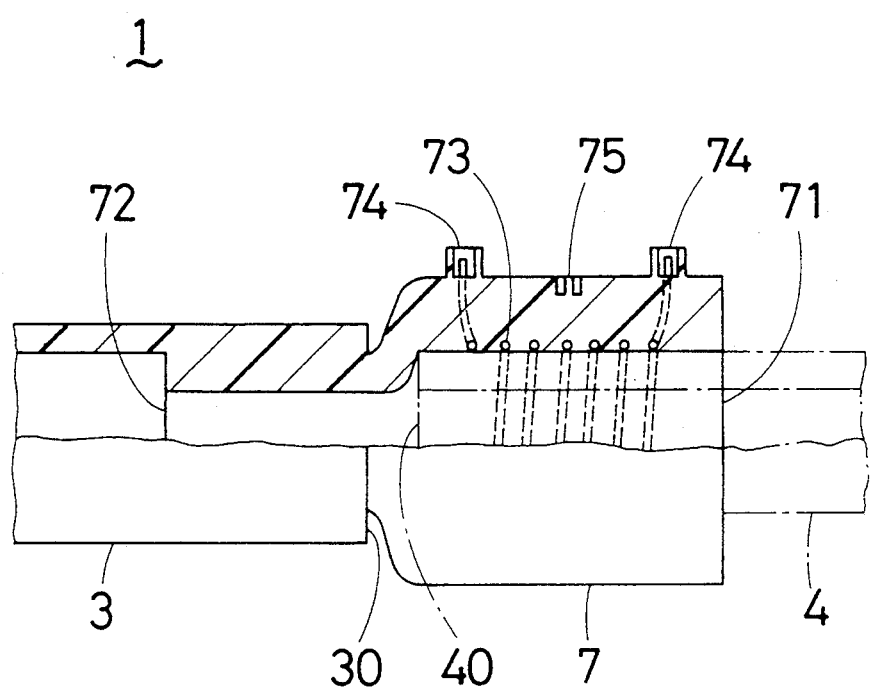
FIG. 27 is a partially cutaway view showing a further different embodiment of the pipe connecting member.

By fitting and integrating the opening end portion 30 of the conduit composing part 3 to the connecting part 52 of thus formed receiving member 5, the pipe connecting member 1 is formed. As the method of integrating, as shown in FIG. 25, a fusion machine 61 may be used so as to be bonded with the outer circumference of the opening end portion 30 of the conduit composing part 3 and the inner circumference of the connecting part 52 of the receiving member 5. That is, the fusion machine 61 is bonded to the outer circumference of the opening end portion 30 of the conduit composing part 3 and to the inner circumference of the connecting part 52 of the receiving part 5, and after fusing these junction parts, they are detached off the fusion machine 61, and in the same fused state, the outer circumference of the opening end portion 30 of the conduit composing part 3 and the inner circumference of the connecting part 52 of the receiving member 5 are joined. By cooling the junction parts, they are integrated. In this embodiment, the connecting part 52 and the opening end portion 30 are integrated by the fusion machine 61, but, as shown in FIG. 26, it may be also possible to feed current through an energization terminal 58 by burying a coil 57 heated by energization, in the connecting part 52.

FIG. 27 through FIG. 31 refer to a further different embodiment of the pipe connecting member 1 of the invention. In this embodiment, only the receiving member 7 is different from the receiving member 2 of the former embodiment, and only the receiving member 7 is explained below. In these drawings, the same constituent elements as in the above embodiment are identified with the same reference numbers.

The receiving member 7 is cylindrical, and its one end is a fusion part 71, while the other end is a connecting part 72. In the fusion part 71, resin pipe 4 can be fitted in its inner circumference. In the inner circumference, moreover, a coil 73 to be heated by energization is buried. The end of the coil 73 is wired to an energization terminal 74 projecting on the outer circumference of the fusion part 71 so as to be energized from the energization terminal 74. On the outer circumference of the fusion part 71, an indicator 75 is provided. The base end portion of the fusion part 71 is reduced in diameter to arrest penetration of the end portion 40 of the resin pipe 4 inserted in the fusion part 71.

The connecting part 72 is reduced in diameter in its inner circumference so as to be inserted in the opening end portion 30 of the conduit composing part 3.

Figure 28:
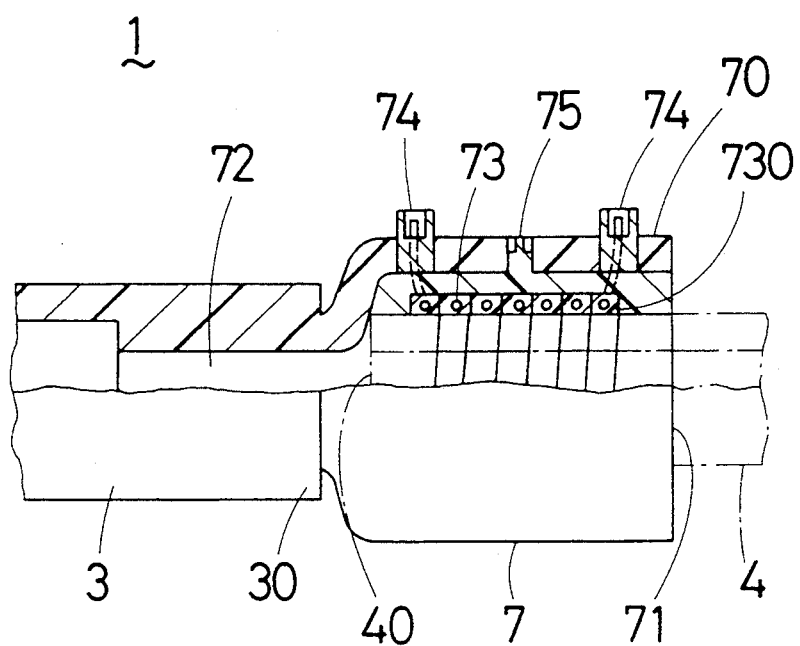
FIG. 28 is a partially cutaway view showing other embodiment of the receiving member in the pipe connecting member shown in FIG. 27.

Such receiving member 7 is obtained by disposing an in-core (not shown) winding the coil 73 in a mold (not shown), and injection molding a resin material at high pressure, but when the receiving member 7 is large in diameter, a more resin material must be injected. Therefore, as shown in FIG. 28, a sheath tube 70 for composing the outer layer of the receiving member 7 is disposed outside of the coil 73 coated with a resin layer 730, and the resin material may be injection molded by integrating the sheath tube 70 and coil 73.

Figure 29:
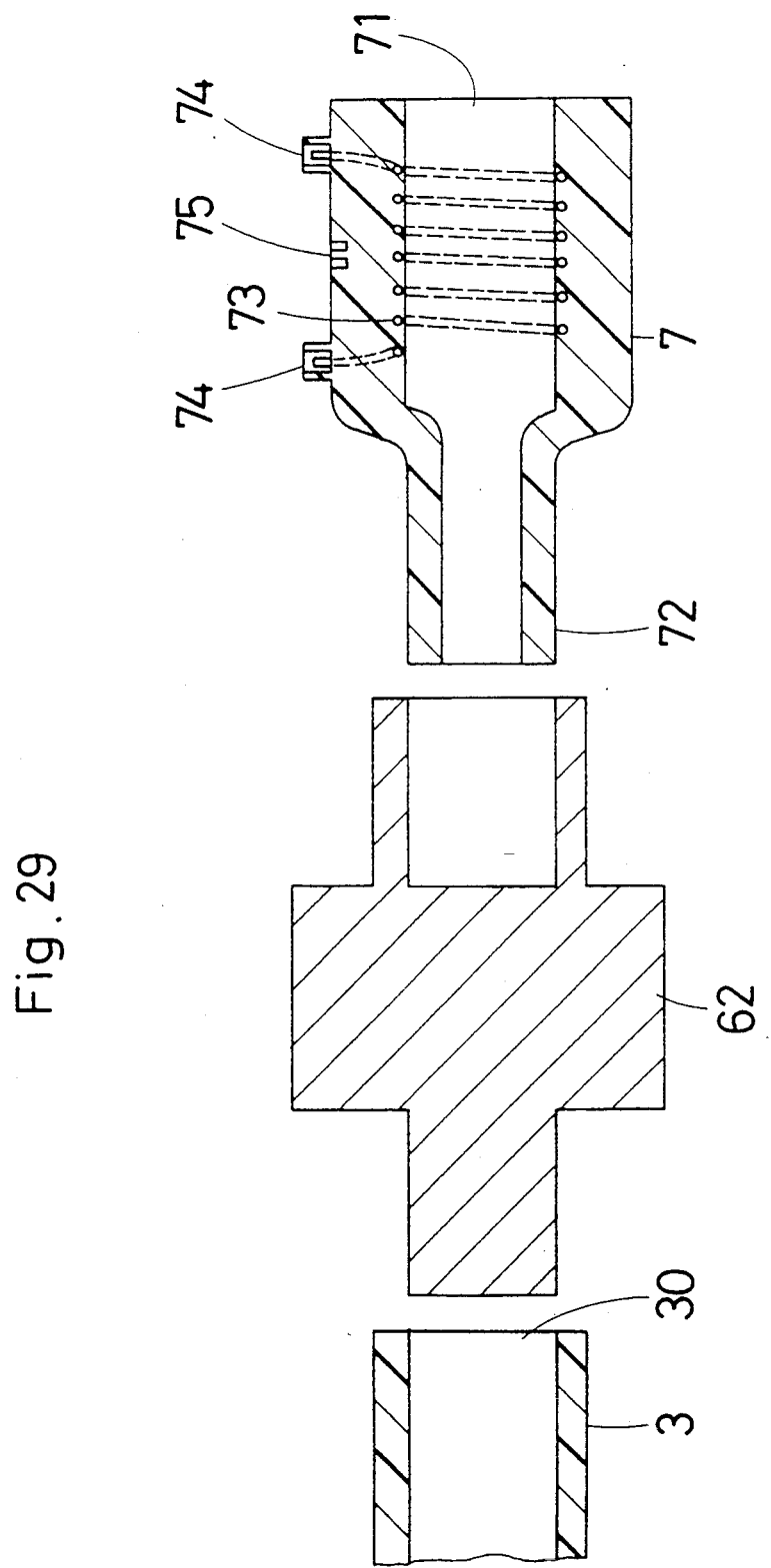
FIG. 29 is an explanatory diagram showing a manufacturing method of the pipe connecting member shown in FIG. 27.
Figure 30:
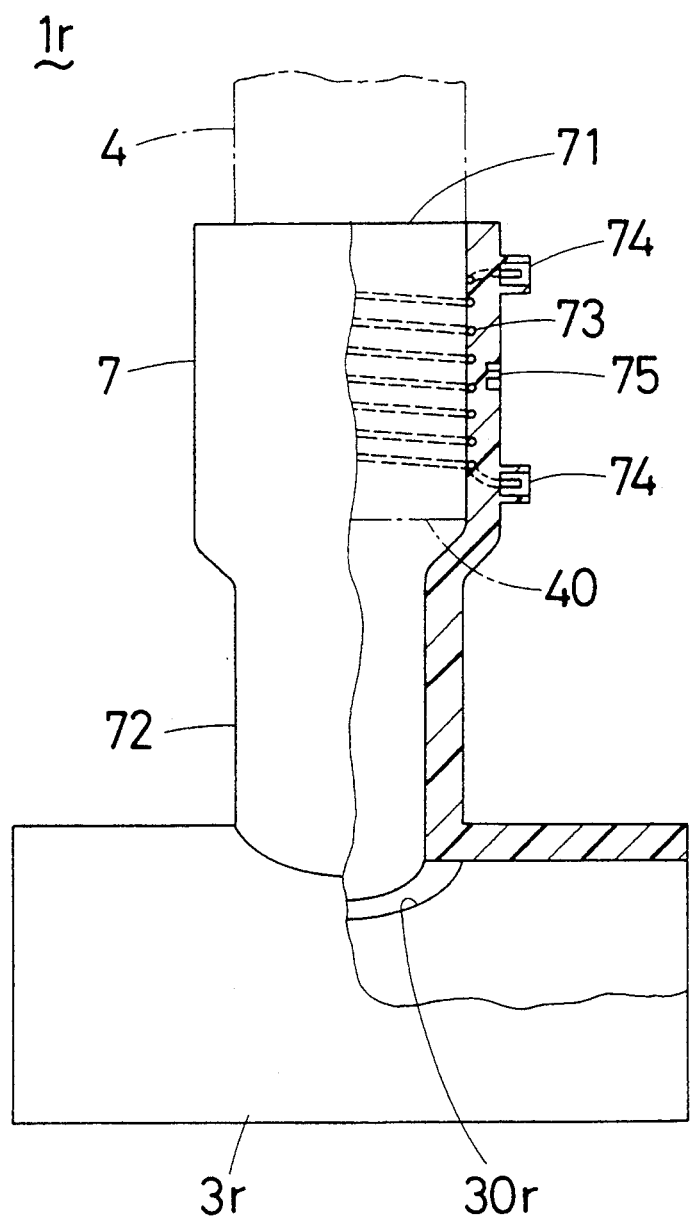
FIG. 30 is a partially cutaway view showing a practical example of the pipe connecting member shown in FIG. 27.
Figure 31:
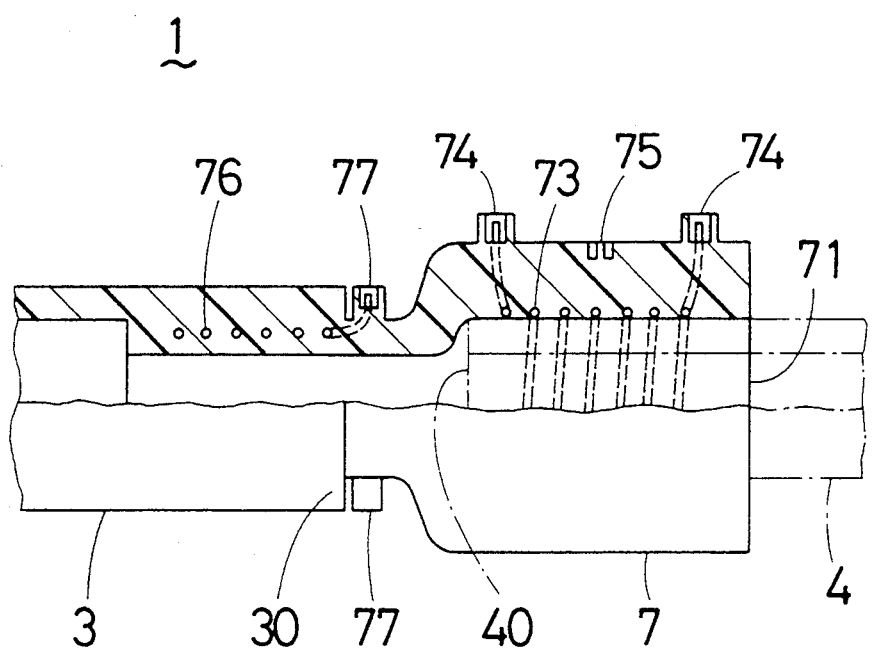
FIG. 31 is a partially cutaway view showing a different embodiment of the pipe connecting member shown in FIG. 27.
Figure 32:
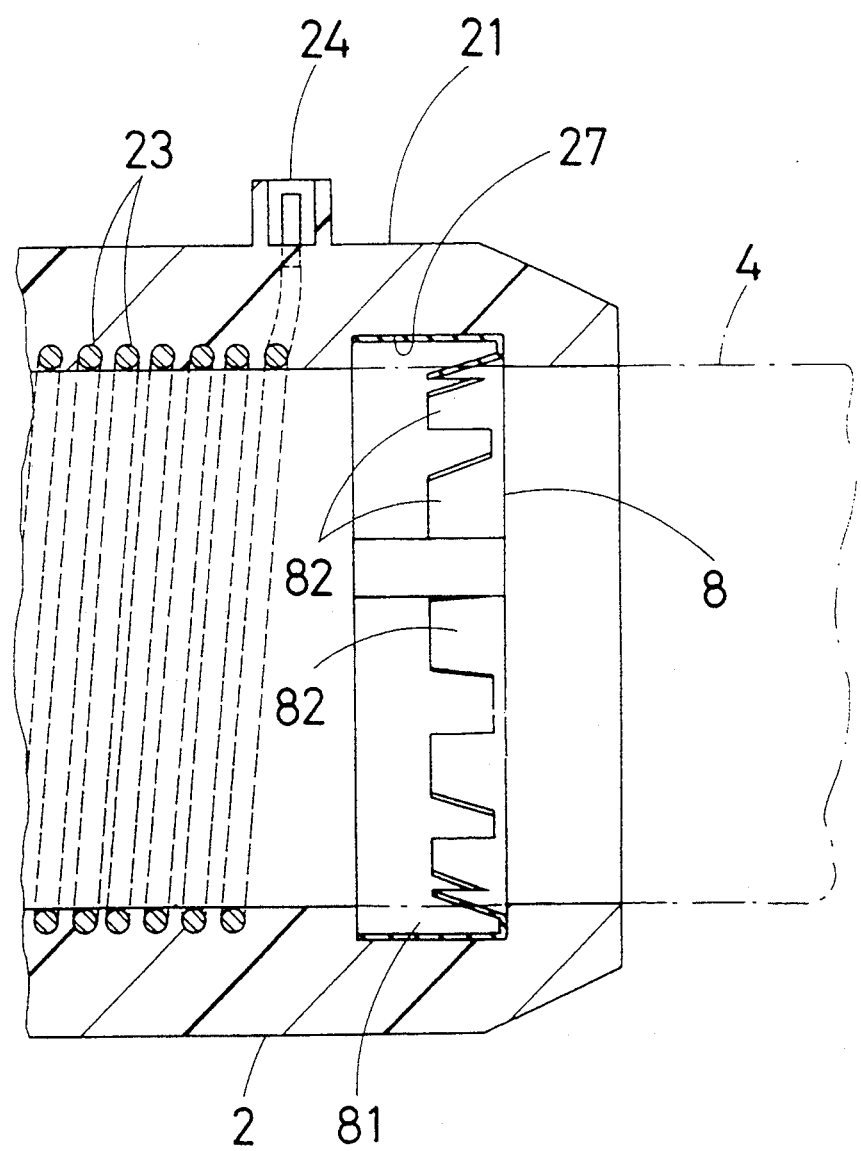
FIG. 32 is a partial sectional view showing the state of installing a stopping ring in the fusion part of the receiving member of the pipe connecting member.

By fitting and integrating the connecting part 72 to the opening end portion 30 of the conduit composing part 3, the pipe connecting member 1 is formed. As this integrating method, as shown in FIG. 29, a fusion machine 62 may be used for joining the inner circumference of the opening end portion 30 of the conduit composing part 3 and the outer circumference of the connecting part 72 of the receiving member 7. That is, the fusion machine 62 is joined to the inner circumference of the opening end portion 30 of the conduit composing part 3 and the outer circumference of the connecting part 72 of the receiving member 7, and the junction portions are fused, and taken out of the fusion machine 62, and in this fusion state, consequently, the inner circumference of the opening end portion 30 of the conduit composing part 3 and the outer circumference of the connecting part 72 of the receiving member 7 are joined. By cooling the fitted portions, they are integrated. In the case of the receiving member 7 of the embodiment, meanwhile, since it is intended to integrate by inserting the connecting part 72 into the opening end portion 30, a tee joint 1r may be formed by inserting and integrating the connecting part 72 of the receiving member 7 in the opening end portion 30r. In this embodiment, moreover, the connecting part 72 and the opening end portion 30 are integrated by the fusion machine 62, but as shown in FIG. 31, it may be also designed to energize from an energization terminal 77 by burying a coil 76 heated by energization in the connecting part 72.

FIG. 32 through FIG. 38 relate to a further different embodiment of the pipe connecting member 1 of the invention. In this embodiment, by disposing an annular groove 27 around the inner circumference of the fusion part 21 of the receiving member 2 in the foregoing embodiment, and disposing a stopping ring 8 in the annular groove 27, it is intended to prevent slip-out of the resin pipe 4 inserted in the fusion part 21 by the stopping ring 8. Only the different points are explained herein, and the other explanations are omitted. In these drawings, the same constituent elements as in the foregoing embodiment are identified with same reference numbers. The following description relates to the pipe connecting member 1 provided with the receiving member 2, but the stopping ring 8 may be similarly disposed in the pipe connecting member 1 furnished with the receiving member 5 or receiving member 7 shown in the other preceding embodiments.

Figure 33:
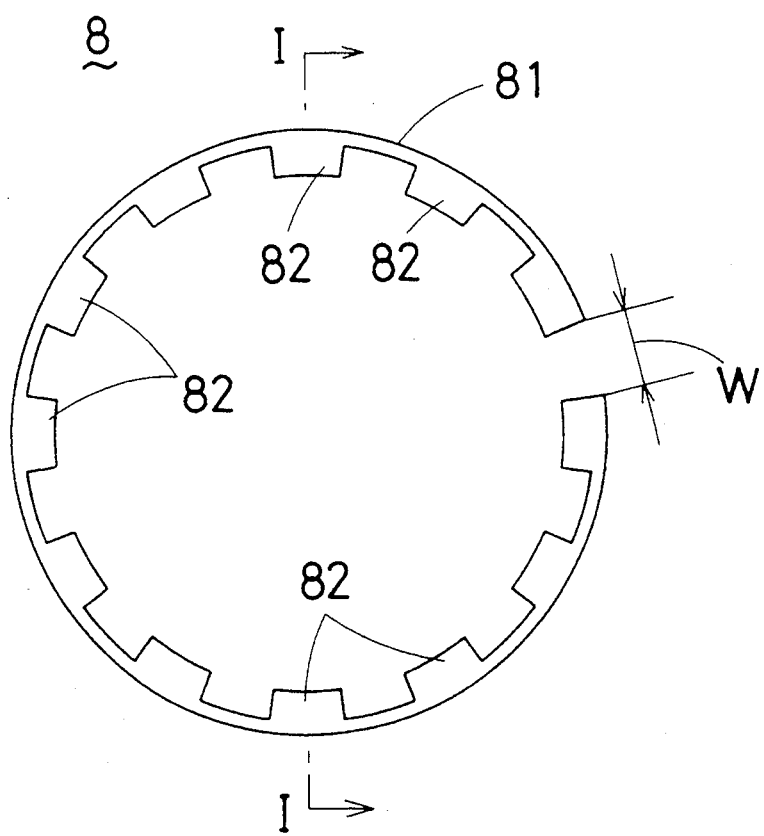
FIG. 33 is a front view showing the stopping ring.

The annular groove 27 is disposed around the inner circumference near the opening part of the fusion part 21. The stopping ring 8 is composed of, as shown in FIG. 33 and FIG. 34, a base material 81 curving and forming a plate-shaped wire material in a ring shape, and plural detent pieces 82 disposed on the base material 81. However, the base material 81 is not a complete endless ring, but a gap N is formed between the ends. The detent pieces 82 are disposed in the peripheral edge at one end of the base material 81, and are projected in an oblique direction toward the central direction of the stopping ring 8 so that an acute angle may be formed between the detent pieces 82 and the base material 81. The stopping ring 8 is contracted in diameter so as to fill up the gap W, and is inserted into the annular groove 27 from the vicinity of the opening of the fusion part 21.

Consequently, the stopping ring 8 is dilated again in the annular groove 27 of the portion corresponding to the gap N, and is disposed in the annular groove 27. In this state, however, the detent pieces 82 formed in the stopping ring 8 must be disposed so that the front end may be directed to the inner side of the fusion part 21.

Figure 35:
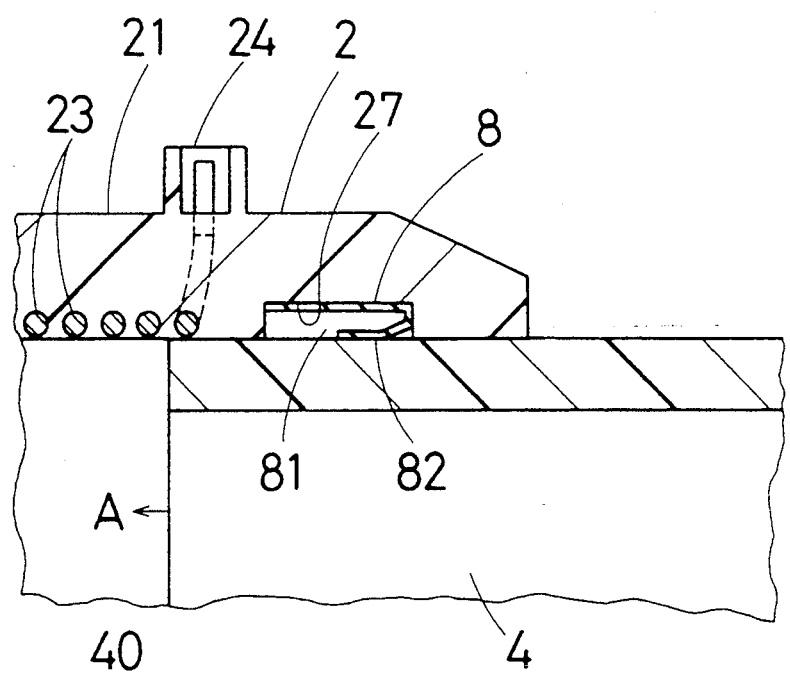
Figure 36:
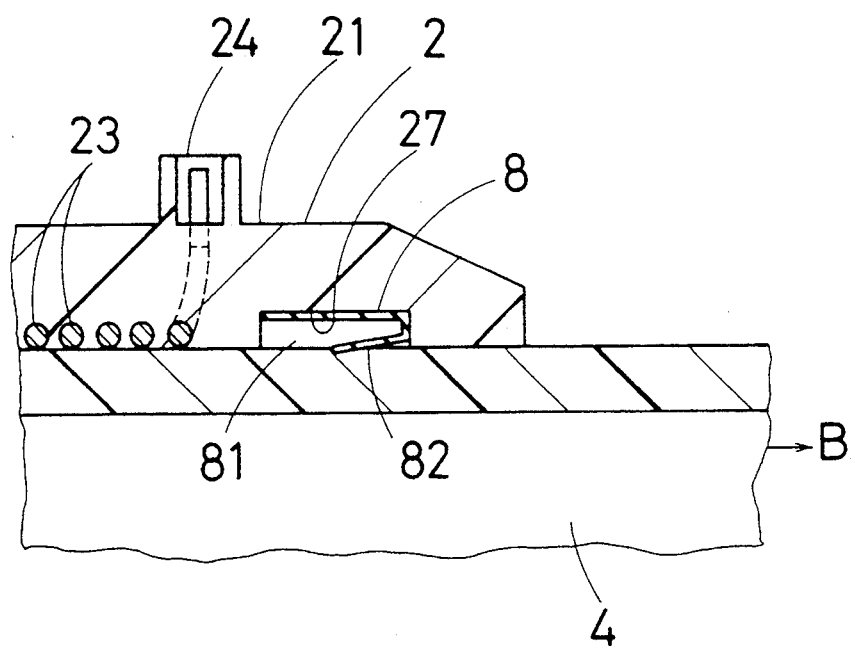

As shown in FIG. 35, when the resin pipe 4 is inserted in the fusion part 21 disposing the stopping ring 8 (arrow A direction), the slope of the detent pieces 82 is pressed by the outer circumference of the resin pipe 4, and the detent pieces 82 are deformed elastically so that the resin pipe 4 may be inserted. Then, as shown in FIG. 36, when it is attempted to draw out the resin pipe 4 from the fusion part 21 (arrow B direction), the front end of the detent pieces 82 bites into the outer circumference of the resin pipe 4 and is fixed so as not to slip out. As a result, only by pushing the resin pipe 4 into the fusion part 21, the resin pipe 4 can be fixed inside the fusion part 21, and it is not necessary to fix with jig (not shown) in the fusion work. At the same time, the resin pipe 4 inserted in the fusion part 21 is centered in the central position by the detent pieces 82.

Incidentally, the materials are not particularly limited as far as the stopping ring 8 can be inserted in the annular groove 27 by dilating or contracting the diameter, and the detent pieces 82 may be deformed elastically, and they may be composed of metals, plastics, and other materials.

Figure 37:
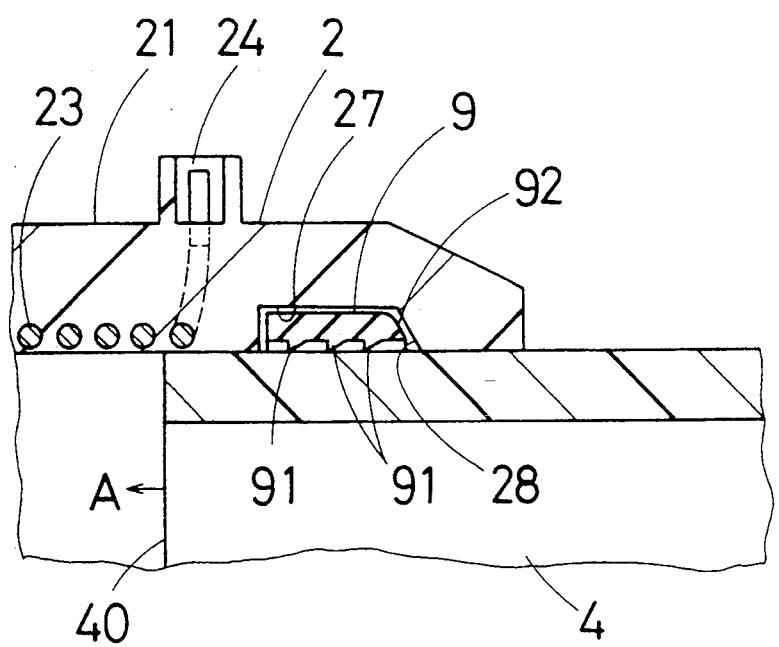
FIG. 37 and FIG. 38 are sectional views of essential parts for explaining the action of the stopping ring in different shapes.
Figure 38:
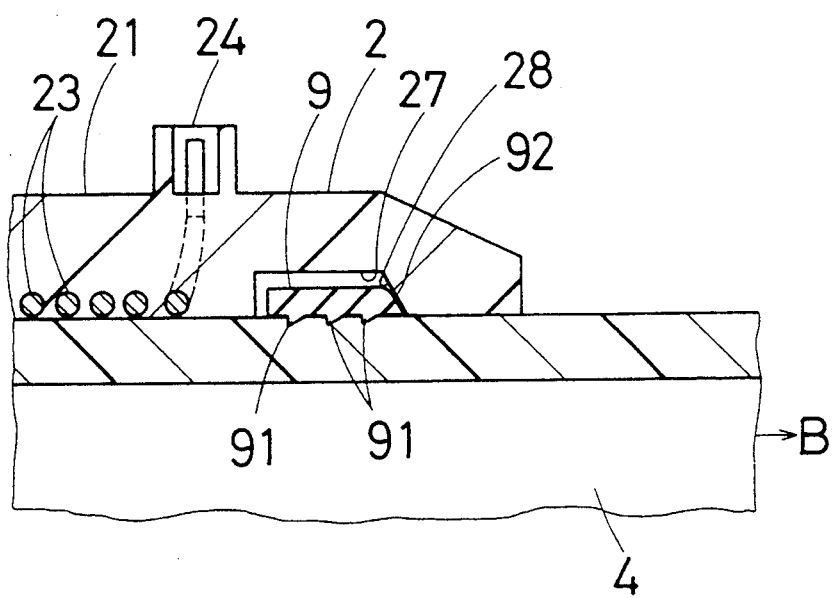

The stopping ring 8 is not limited to the above example alone, but, for example, the stopping ring 9 as shown in FIG. 37 and FIG. 38 may be also used. In this stopping ring 9, a detent protrusion 91 is disposed on the inner circumference, and a slope 92 is formed on the outer circumference so as to be freely fitted in the annular ring 27. Besides, the annular groove 27 has a slope 28 formed at the position corresponding to the slope 92 of the stopping ring 9. That is, when the resin pipe 4 is inserted in the fusion part 21 having the stopping ring 9 (arrow A direction), the stopping ring 9 is dilated, and the resin pipe 4 is inserted. When it is attempted to pull the resin pipe 4 out of the fusion part 21 (arrow B direction), the slope 92 of the stopping ring 9 rides over the slope 28 of the annular groove 27. As a result, the detent protrusion 91 bites into the outer circumference of the resin pipe 4, and is fixed without slipping out.

Figure 39:
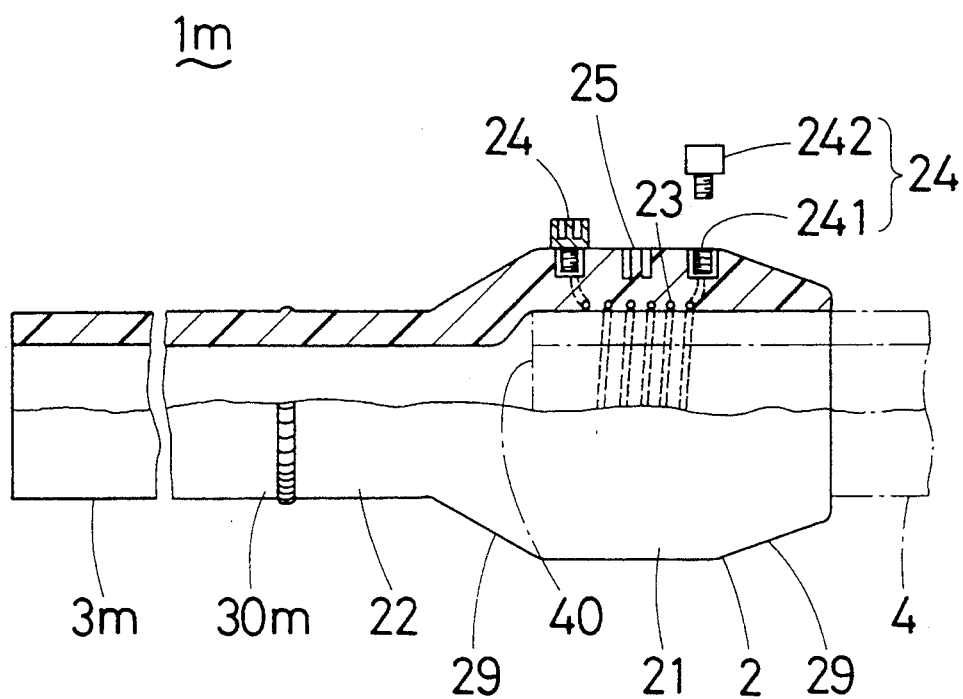
FIG. 39 is a partially cutaway view showing a further different embodiment of a resin pipe with a receiving port as a practical example of the pipe connecting member.

FIG. 39 shows other embodiment of a resin pipe with a receiving opening 1m, of the pipe connecting member 1 according to the invention. In the drawing, the same constituent elements as in the foregoing embodiments are identified with same reference numbers. Herein, the resin pipe with receiving opening 1m formed by using the receiving member 2 is explained, but it is the same in the resin pipe with receiving opening (not shown) formed by using the receiving member 5 or receiving member 7 shown in the other embodiments.

This resin pipe with receiving opening 1m is composed of a female type receiving member 241 and a male type terminal pin 242 to be mutually screwed with an energization terminal 24 of the receiving member 2. The receiving member 241 is preliminarily buried in the receiving member 2, and at the time of fusion, consequently, the terminal pin 242 is screwed to the receiving member 241 to fuse. Taper surfaces 29 are formed in the peripheral areas at both ends of the receiving member 2, and it is designed so that the resin pipe with receiving port 1m may be used in the propulsion process.

Using this resin pipe with receiving port 1m, since the terminal pin 242 is detachable, the terminal pin 242 may be detached beforehand, at the time of transportation or the like, so that the outer circumference of the receiving member 2 may be free from protrusion, and therefore breakage of the energization terminal 24 may be prevented. When the resin pipe with receiving port 1m is used in the propulsion process, the resistance of the soil may be reduced, so that the job may be done easily.

TECHNICAL APPLICABILITY

Thus, the pipe connecting member of the invention excels in productivity and installation characteristics in various pipings, and the fusion job may be done easily and simply.

We claim:
1. A pipe connecting member, comprising:

a cylindrical receiving member having a first end and a second end, said first end having a fusion part into which an end portion of a resin pipe can be received and having a coil buried therein, said coil having two energization terminals to allow said coil to be heated by energization, and said second end having a connecting part; said cylindrical receiving member having an indicator on an outer surface thereof; and a conduit composing part having at least one opening; said connecting part of said second end of said receiving member is connected to one opening of said conduit composing part;

wherein an annular groove is disposed around an inner circumference of said fusion part of said receiving member, and a stopping ring is disposed in said annular groove so as to engage the resin pipe inserted in said fusion part when the resin pipe is to be moved in a direction in which the resin pipe is drawn out, and to allow the resin pipe to move when the resin pipe advances in a direction in which it is inserted.

2. A pipe connecting member of claim 1, wherein said connecting part of said receiving member is connected butt to butt to said one opening of said conduit composing part.

3. A pipe connecting member of claim 2, wherein said conduit composing part is a straight pipe.

4. A pipe connecting member of claim 3, wherein said receiving member has a taper part formed in outer circumferential portions of both ends thereof.

5. A pipe connecting member of claim 2, wherein conduit composing part includes at least one of a bent part, a branch part, a reducing part, and a joint part.

6. A pipe connecting member of claim 1, wherein said one opening of said conduit composing part is inserted in said connecting part of said receiving member to be integrated.

7. A pipe connecting member of claim 6, wherein integration of said fusion part with the end portion of the resin pipe is effected by fusion of said fusion part with the end portion of the resin pipe by heat generation caused by energization of said coil.

8. A pipe connecting member of claim 6, wherein said conduit composing part includes at least one of a bent part, a branch part, a reducing part, and a joint part.

9. A pipe connecting member of claim 6, wherein said conduit composing part is a straight pipe.

10. A pipe connecting member of claim 9, wherein said receiving member has a taper part formed in the outer circumferential portions of the both ends thereof.

11. A pipe connecting member of claim 1, wherein said connecting part of said receiving member is fitted into said one opening of said conduit composing part to be integrated.

12. A pipe connecting member of claim 11, wherein integration of said fusion part with the end portion of the resin pipe is effected by fusion of said fusion part with the end portion of the resin pipe by heat generation caused by energization of said coil.

13. A pipe connecting member of claim 11, wherein said conduit composing part is a straight pipe possessing an opening in an outer circumference thereof, and said connecting part of said receiving member is fitted in said opening in said outer circumference.

* * * * *